(12) United States Patent
Florissi et al.

(10) Patent No.: US 9,280,381 B1
(45) Date of Patent: Mar. 8, 2016

(54) EXECUTION FRAMEWORK FOR A DISTRIBUTED FILE SYSTEM

(75) Inventors: Patricia G. S. Florissi, Briarcliff Manor, NY (US); Sudhir Vijendra, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 728 days.

(21) Appl. No.: 13/535,712

(22) Filed: Jun. 28, 2012

Related U.S. Application Data

(63) Continuation-in-part of application No. 13/435,009, filed on Mar. 30, 2012.

(51) Int. Cl.
- *G06F 9/46* (2006.01)
- *G06F 9/54* (2006.01)
- *H04L 29/08* (2006.01)
- *G06F 9/50* (2006.01)
- *G06F 11/07* (2006.01)

(52) U.S. Cl.
CPC .. *G06F 9/46* (2013.01); *G06F 9/54* (2013.01); *H04L 67/10* (2013.01); *G06F 9/5072* (2013.01); *G06F 11/0709* (2013.01)

(58) Field of Classification Search
None
See application file for complete search history.

(56) References Cited

U.S. PATENT DOCUMENTS

| | | | | |
|---|---|---|---|---|
| 6,920,475 B1 * | 7/2005 | Klots | .................... | G06F 9/5044 709/201 |
| 7,590,620 B1 * | 9/2009 | Pike et al. | | |
| 8,356,050 B1 * | 1/2013 | Olston et al. | ................... | 707/769 |
| 8,549,518 B1 * | 10/2013 | Aron et al. | ........................ | 718/1 |
| 8,627,336 B2 * | 1/2014 | Wee | ........................ | G06F 9/546 713/189 |
| 8,949,558 B2 * | 2/2015 | Castillo et al. | ................ | 711/162 |
| 8,972,986 B2 * | 3/2015 | Palanisamy | ........... | G06F 9/5066 718/1 |
| 9,020,802 B1 * | 4/2015 | Florissi | ................... | G09F 9/445 703/22 |
| 9,158,843 B1 * | 10/2015 | Florissi | ............. | G06F 17/30823 |
| 2010/0122065 A1 * | 5/2010 | Dean et al. | ..................... | 712/203 |
| 2010/0179855 A1 * | 7/2010 | Chen et al. | ...................... | 705/10 |
| 2010/0228951 A1 * | 9/2010 | Liu | ............................... | 712/203 |
| 2011/0161294 A1 * | 6/2011 | Vengerov et al. | ............. | 707/637 |
| 2011/0302151 A1 * | 12/2011 | Abadi et al. | .................. | 707/714 |
| 2011/0302583 A1 * | 12/2011 | Abadi et al. | .................. | 718/102 |
| 2012/0278578 A1 * | 11/2012 | Castillo | .................... | G06F 12/02 711/165 |
| 2012/0311589 A1 * | 12/2012 | Agarwal et al. | ............... | 718/102 |
| 2013/0104140 A1 * | 4/2013 | Meng et al. | .................... | 718/104 |
| 2013/0132309 A1 * | 5/2013 | Kvernvik et al. | ............... | 706/12 |
| 2013/0332612 A1 * | 12/2013 | Cai et al. | ........................ | 709/226 |

OTHER PUBLICATIONS

Sun Microsystem Inc.; Lustre with Hadoop white paper v0.4.2, Aug. 7, 2009, (Hadoop__2009.pdf; pp. 1-27).*

Luo et al.; "A Hierarchical Framework for Cross-Domain MapReduce Execution" Jun. 8, 2011; (Luo__Jun2011.pdf; pp. 1-8).*

(Continued)

*Primary Examiner* — Hiren Patel
(74) *Attorney, Agent, or Firm* — Krishnendu Gupta; Joseph D'Angelo

(57) ABSTRACT

A computer program product, apparatus and method comprising representing a worldwide job tracker, and representing worldwide task trackers; the worldwide task trackers communicatively coupled to the worldwide job tracker; wherein the worldwide job tracker is enabled to execute a worldwide job by distributing the job across the world wide task trackers.

15 Claims, 31 Drawing Sheets

(56) References Cited

OTHER PUBLICATIONS

IBM, "WO 2011/134875 A1" "Data Center Operation" Apr. 20, 2011, (WO2011134875.pdf; pp. 1-40).*

Yale University, Likowski et al. "WO 2011/153242"; "Query Execution System and Methods", Jun. 1, 2011, (WO2011153242.pdf; pp. 1-51).*

Brad Hedlund; ("http://bradhedlund.com/2011/09/10/understanding-hadoop-clusters-and-the-network/#download"; Sep. 10, 2011); Brad_Sep10_2011.pdf, pp. 1-25.*

Yuan Luo, Zhenhua Guo, Yiming Sun, Beth Plale, Judy Qiu, Wilfred W. Li; A Hierarchical Framework for Cross-Domain MapReduce Execution; School of Informatics and Computing, Indiana University, Bloomington, IN, 47405; San Diego Supercomputer Center, University of California, San Diego, La Joila, CA. 92093.

* cited by examiner

EXECUTION FRAMEWORK FOR A DISTRIBUTED FILE SYSTEM

RELATED APPLICATIONS AND PRIORITY CLAIM

This Application is a Continuation-in-Part of U.S. patent application Ser. No. 13/435,009 entitled "BIOINFORMATICS CLOUDS AND BIG DATA ARCHITECTURE" filed on Mar. 30, 2012, the contents and teachings of which are incorporated herein by reference in their entirety, which application claims the benefit of U.S. Provisional Patent Application Ser. No. 61/578,757 entitled "BIOINFORMATICS CLOUDS AND BIG DATA ARCHITECTURE" filed on Dec. 21, 2011, the contents and teachings of which are incorporated herein by reference in their entirety.

This Application is related to U.S. patent application Ser. No. 13/535,684 entitled "WORLDWIDE DISTRIBUTED FILE SYSTEM MODEL"; Ser. No. 13/535,696 entitled "WORLDWIDE DISTRIBUTED ARCHITECTURE MODEL AND MANAGEMENT"; Ser. No. 13/535,731 entitled "PARALLEL MODELING AND EXECUTION FRAMEWORK FOR DISTRIBUTED COMPUTATION AND FILE SYSTEM ACCESS"; Ser. No. 13/535,814 entitled "WORLDWIDE DISTRIBUTED JOB AND TASKS COMPUTATIONAL MODEL"; Ser. No. 13/535,744 entitled "ADDRESSING MECHANISM FOR DATA AT WORLD WIDE SCALE"; Ser. No. 13/535,760 entitled "SCALABLE METHOD FOR OPTIMIZING INFORMATION PATHWAY"; Ser. No. 13/535,796 entitled "CO-LOCATED CLOUDS, VERTICALLY INTEGRATED CLOUDS, AND FEDERATED CLOUDS"; and Ser. No. 13/535,821 entitled "DISTRIBUTED PLATFORM AS A SERVICE", filed on even date herewith, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to Big Data.

BACKGROUND

The amount of data in our world has been exploding. Companies capture trillions of bytes of information about their customers, suppliers, and operations, and millions of networked sensors are being embedded in the physical world in devices such as mobile phones and automobiles, sensing, creating, and communicating data. Multimedia and individuals with smartphones and on social network sites will continue to fuel exponential growth. Yet, the impact this growing amount of data will have is unclear.

SUMMARY

A computer program product, apparatus and method comprising representing a worldwide job tracker, and representing worldwide task trackers; the worldwide task trackers communicatively coupled to the worldwide job tracker; wherein the worldwide job tracker is enabled to execute a worldwide job by distributing the job across the world wide task trackers.

DESCRIPTION OF DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
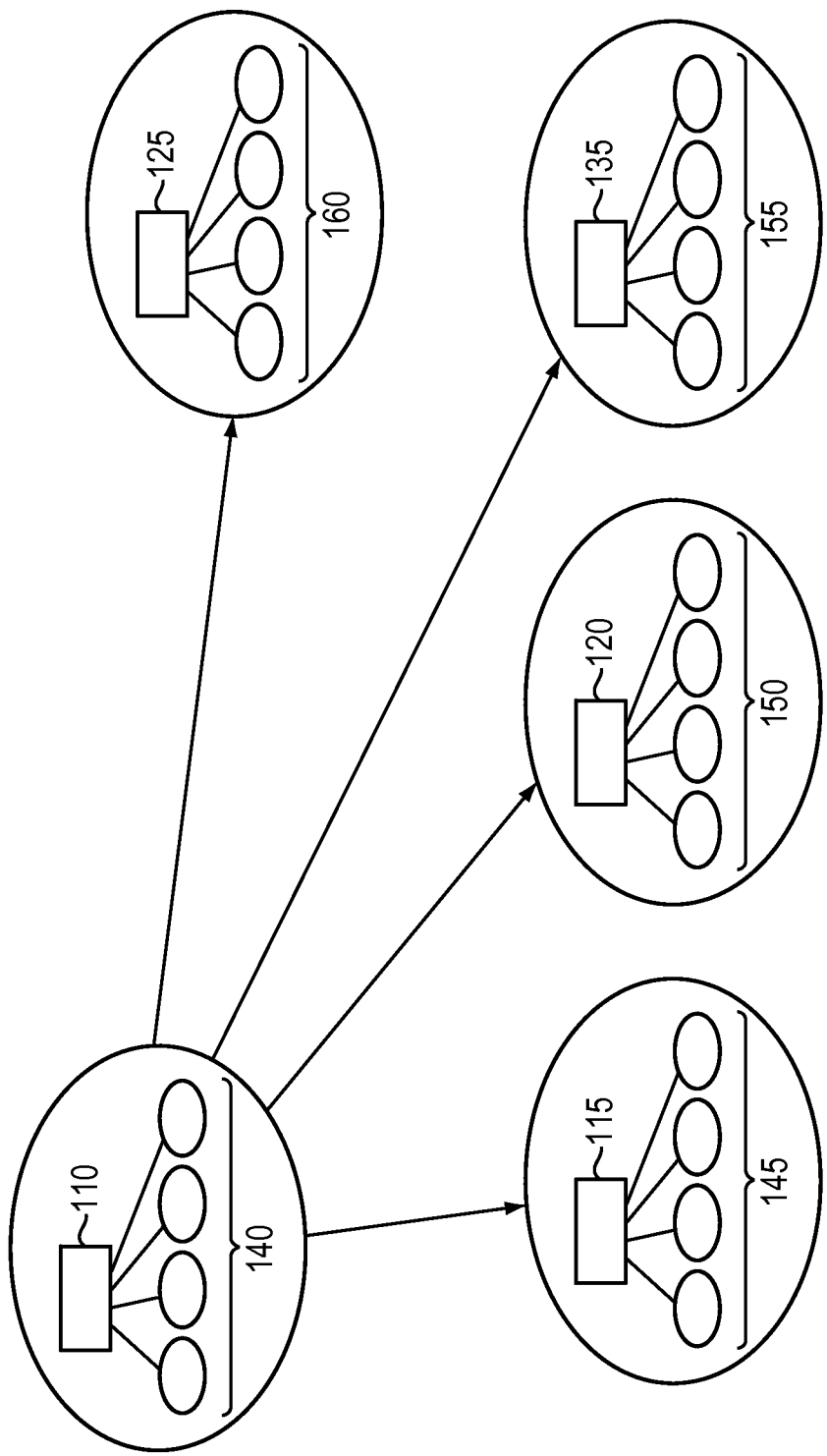
FIG. 1 is an example illustration of a set of Hadoop clusters, in accordance with an embodiment of the present disclosure.

Generally, the amount of data capture has grown in every area of global economy. Normally, companies are churning out increasing amounts of transactional data, capturing trillions of bytes of information about their customers, suppliers, and operations. Conventionally, millions of networked sensors embedded in the physical world in devices such as mobile phones, smart energy meters, automobiles, and industrial machines create data that is recorded and stored (computed, archived, analyzed . . . ). Usually, as companies and organizations generate a tremendous amount of digital data that are created as a by-product of their activities. Often, enterprises may be collecting data with greater granularity and frequency, capturing every customer transaction, attaching more personal information, and also collecting more information about consumer behavior in many different environments. Usually, this activity increases the need for more storage and analytical capacity.

Typically, social media sites, smartphones, and other consumer devices including PCs and laptops have allowed billions of individuals around the world to contribute to the amount of data available. Normally, consumers communicate, browse, buy, share, and search creating large amounts of consumer data. However, conventional techniques are not able to monitor or analyze this "Big Data." Generally, conventional modeling techniques do not accommodate for or do not model the properties that define Big Data. For example, conventional techniques may not be able to perform analysis on Big Data because of the sheer number and size of transaction that would be necessary to perform the analysis. As well, conventional techniques may consider elements as attributes of the data when, to properly represent the Big Data these "attributes" may need to be considered as properties of the Big Data.

In some embodiments, "Big Data" may refer to a dataset that has a size, volume, analytical requirements, or structure demands larger than typical software tools may capture, store, manage, and analyze. In certain embodiments, "Big Data" may refer to a dataset that has a combination of attributes, such as size, volume, structure, or analytical requirements, with which typical software tools may not be able to work. In most embodiments, big data is not defined in terms of being larger than a certain number of terabytes rather, as technology advances over time, the size of datasets that qualify as big data may also increase. In certain embodiments, data transfer speed and no of transactions may also attributes of Big Data.

In further embodiments, the definition of "Big Data" may vary by sector or industry, depending on what kinds of software tools are commonly available and what sizes of datasets are common in a particular industry. Big Data may refer to data from Digital Pathology, data from seismological surveys, data from the financial industry, and other types of data sets that are generally too large, for example in size or number of transactions, to be modeled an analyzed with conventional techniques.

Typically, organizations and business units share IT services, which may result in the creation of Big Data. Generally, the network, apps, and servers are shared and/or dedicated in many instances. Usually, of cloud and Big Data models and analytic platforms provide opportunities for the storage business. However, conventional file sizes vary depending on the verticals, domains and type of data. Conventionally solutions provide a good infrastructure to host files that are large in size, but not for smaller files.

For example, a conventional cluster type architecture for big data assumes a flat commodity world, where processing cores and disk drives are cheap and abundant, even though they may and will fail often, applications are computing and data intensive, where computations may need to be done over the entire data set; and in processing Big Data, transfer time becomes the new bottleneck. Traditionally, a Cluster architecture may be based on a set of very simple components and assumes that there are hundreds or thousands of these components together, a node may have a set of processing cores attached to a set of disks, a rack may have a stack of nodes, and a cluster may have a group of racks. Conventionally, within the context of a Cluster, Big Data is typically divided into equal size blocks and the blocks are distributed across the disks in the nodes. Usually, the data in each node may processed by the processing cores in the node providing Data Locality where the data is collocated with the computing node.

Typically, distributed file systems may provide data in a data center to be split between nodes. Generally, a distributed file system may split, scatter, replicate and manage data across the nodes in a data center. Typically, a file system may be a distributed file system when it manages the storage across a network of machines and the files are distributed across several nodes, in the same or different racks or clusters. Conventionally, map reduce may be a computational mechanism to orchestrate the computation by dividing tasks, collecting and re-distributing intermediate results, and managing failures across all nodes in the data center. In certain embodiments, the current techniques may enable data to be split between nodes. In other embodiments, the current techniques may enable computation on data that has been split between nodes.

Conventionally, a distributed file system may a set of equal size blocks. Typically these blocks may be multiples of a simple multiplier, such as 512 kb. Generally, file blocks may be the unit used to distribute parts of a file across disks in nodes. Usually, as disks in a node and nodes in a rack may fail, the same file block may be stored on multiple nodes across the cluster. Typically, the number of copies may be configured. Usually, the Name Node may decide in which disk each one of the copies of each one of the File Blocks may reside and may keep track of all that information in local tables in its local disks. Conventionally, when a node fails, the Name Node may identify the file blocks that have been affected; may retrieve copies of these file blocks from other healthy nodes; may find new nodes to store another copy of them, may store these other copies; and may update this information in its tables. Typically, when an application needs to read a file, may connects to the Name Node to get the addresses for the disk blocks where the file blocks are and the application may then read these blocks directly without going through the Name Node anymore.

Generally, Big Data is Multi Structured and may be conventionally stored, analyzed and managed each type of information in a number of different ways. In some embodiments, structured data may be stored in Block based, SQL, and RDBMS type databases. In other embodiments, semi-structured data may be stored in XML Data Files, in File Based systems, and in Hadoop Map Reduce. In further embodiments, quasi-structured data may be data containing some inconsistencies in data values and formats, e.g., Web clickstream data. In some embodiments, unstructured data may be text documents that could be subject to analytics over text or numbers such as file based data, Hadoop MapReduce, and HDFS data. In other embodiments, unstructured data may be images and video such as file based data, and data streamlined with technologies such as MapReduce, or Scale Out NAS data. Typically, it may be difficult to process information stored in all different formats, cross-analyze content, or visualize and gain insight into the important information spread all over the different formats.

As used herein, for simplicity, a framework for Massive Parallel Processing (MPP) within the delimiters of a Cluster or data set may be referred to as Hadoop by way of example, however any framework may be used and the current techniques are not limited to use with Hadoop. Generally, the Hadoop framework focuses on Massive Parallel Processing (MPP) within the delimiters of a Cluster or data set. Often, Hadoop may be utilized in an attempt to analyze Big Data.

Usually, Hadoop assumes that data or Big Data has been transferred to a single cluster and has been evenly distributed across the nodes of the cluster. Typically, Hadoop does not enable analysis of data across multiple clusters. Conventionally, different parts of the Big Data may reside on different clusters potentially spread across different clouds. Usually, a retail enterprise may need to analyze its sales transactions over the last 5 years, but it may store last four years' transactions in a Public Cloud while retaining the last 12 months in its own Private Cloud. Generally, the enterprise does not have the storage, processing capacity or bandwidth, to repatriate the last four years worth of Big Data to its private cloud. In an embodiment, the current disclosure enables management of big data sets where the content may exist across numerous clouds or data storage centers. Generally, with respect to the data, there may be two architectural frameworks. Conventional architecture design may assume that there are three main types of hardware resources to be managed, servers, enclosing very expensive processors that should not be idle at any moment in time, storage Arrays, enclosing drives of different performance and capacity ranging from Solid State Drive (SSD) to Fiber Channel and SATA, and Storage Area Network (SAN), connecting a set of servers to a set of storage arrays. Generally, this architecture may assumes that most applications are "computing intensive" meaning that there will be high demand for processing power that performs computation on a subset of all the data available for the application, which may be transferred across the SAN to the servers.

In some embodiments, World Wide Hadoop (WWH) or other big data processing methodologies may enable Massive Parallel Processing (MPP) to be executed across multiple clusters, and clouds without requiring one or more Big Data sets to be located at the same location. In certain embodiments, WWH may have a layer of orchestration on top of Hadoop or a similar architecture that manages the flow of operations or commands across clusters of nodes. Herein, operations and commands may be used interchangeably. In other embodiments, the clusters maybe separate across metro or worldwide distances. In further embodiments, the current techniques may enable World Wide Hadoop (WWH) to enable Genome Wide Analysis (GWA) of Genomes that reside on different Genome Banks, one located in NY and another located in MA.

In certain embodiments, World Wide Hadoop may be applied where big data clouds exist. In certain embodiments, clouds may be extension of the other clouds. In other embodiments, clouds may be an independent cloud. In further embodiments, clouds may be providing an analysis services to other clouds. In some embodiments, the big data clouds may exchange raw data or analyze data for further processing. In certain embodiments, the domain expertise, open data, open science data, analysis etc, may come from different geographic locations and different clouds may host the respective big data. In at least some embodiments, the federation among big data clouds may present an internet infrastructure challenge.

In some embodiments, factors like cost and bandwidth limit may affect the big data Hadoop deployment federation. In certain embodiments, the current techniques may model Hadoop environments. In other embodiments, the current techniques may re-define roles of the Hadoop components in the Hadoop clusters. In certain embodiments, Massive Parallel Processing may be enabled across clouds. In some embodiments, WWH concepts apply where there are many big data clouds, and the clouds may need to either exchange raw data or analyze data for further processing. In some embodiments, as used herein, a cluster may be used interchangeably with a data center.

The following list of acronyms may be useful in understanding the terms use here in:
- WW—World Wide
- WWH—World Wide Hadoop
- DNN—Distributed Name Node
- DDN—Distributed Data Node
- MPP—Massively Parallel Processing
- SSD—Solid State Drive
- GWA—Genome Wide Analysis
- FS—File System
- WWDFS—World Wide Distributed File System
- DFS—Distributed File System
- HDFS—Hadoop Distributed File System
- WWHDFS—World Wide Hadoop Distributed File System
- WWF—World Wide File
- WWN—World Wide Name
- WWFN—World Wide File Name
- WWS—World Wide Scale
- WWJT—World Wide Job Tracker
- WWTT—World Wide Task Tracker
- WWA—World Wide Addressing
- WWD—World Wide Data Data Model In most embodiments a data model or modeling structure may be used to process data across clusters. In most embodiments, the data model may enable representation of multiple data sets. In certain embodiments, this model may include data notes, data clusters, data centers, clouds, and skies.

In most embodiments, the classes, objects, and representations referenced herein may be an extension of known distributed system models, such as the EMC/Smarts Common Information Model (ICIM), or similarly defined or pre-existing CIM-based model and adapted for the environmental distributed system, as will be discussed. EMC and SMARTS are trademarks of EMC Corporation, Inc., having a principle place of business in Hopkinton, Ma, USA. This exemplary model is an extension of the DMTF/SMI model. Model based system representation is discussed in commonly-owned U.S. Ser. No. 11/263,689, filed Nov. 1, 2005, and Ser. No. 11/034,192, filed Jan. 12, 2005 and U.S. Pat. Nos. 5,528,516; 5,661,668; 6,249,755 and 6,868,367, and 7,003,433, the contents of all of which are hereby incorporated by reference. An example of a Big Data Set may be found in commonly-owned U.S. Ser. No. 12/977,680, filed Dec. 23, 2010, entitled "INFORMATION AWARE DIFFERENTIAL STRIPING" the contents of which are hereby incorporated by reference. An example of modeling Big Data Set may be found in commonly-owned U.S. Ser. No. 13/249,330, filed Sep. 30, 2011, and entitled "MODELING BIG DATA" the contents of which are hereby incorporated by reference. An example of analyzing Big Data Set may be found in commonly-owned U.S. Ser. No. 13/249,335, filed Sep. 30, 2011, and entitled "ANALYZING BIG DATA" the contents of which are hereby incorporated by reference.

Generally, referred-to US Patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific Big Data set for which the associated managed component problems may propagate through the analyzed system and the symptoms associated with the data set may be detected an analyzed. An analysis of the symptoms detected may be performed to determine the root cause—i.e., the source of the problem—of the observed symptoms. Other analysis, such as impact, fault detection, fault monitoring, performance, congestion, connectivity, interface failure, in addition to root-cause analysis, may similarly be performed based on the model principles described herein.

WW Hadoop

Now refer to the example embodiment of FIG. 1. In the example embodiment of FIG. 1, there are 5 Hadoop clusters, 110, 115, 120, 125, and 135. Each Hadoop cluster has a name node and a set of processing nodes, such as 140, 145, 150, 155, and 160. In this embodiment, Cluster 110 has a map of the data in each of the other clusters configured to perform a set of operations on each of the other clusters 115, 120, 125, and 135. These operations include opening a file, reading a file, deleting a file, opening a domain, and deleting a domain. Each of the Hadoop clusters may be located in geographically disperse locations.

Operations

Figure 2:
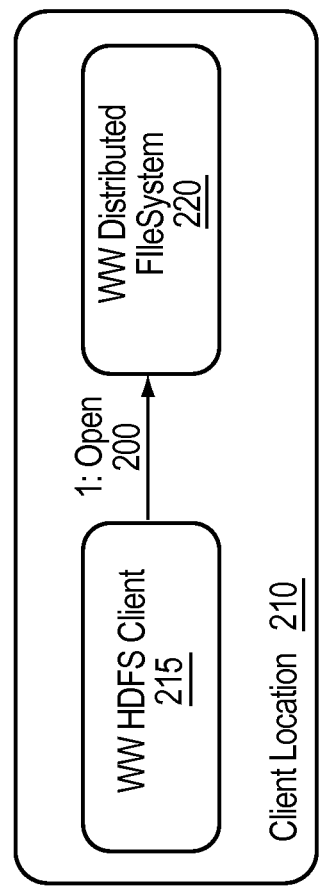
FIG. 2 is a simplified illustration representing Calling the Open( ) Operation for the open domain command, in accordance with an embodiment of the present disclosure.
Figure 3:
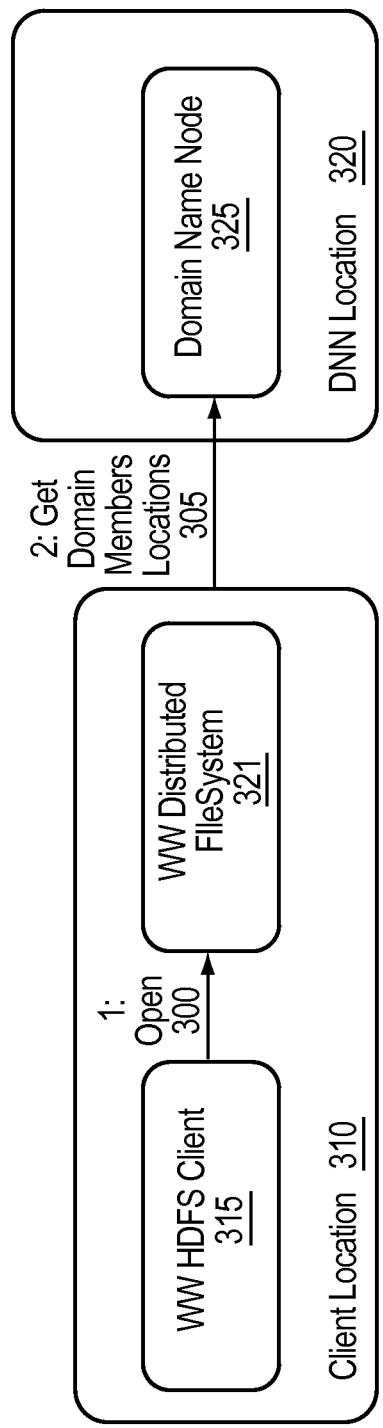
FIG. 3 is a simplified illustration getting Locations for Domain Members for the open domain command, in accordance with an embodiment of the present disclosure.

A first cluster of the group of Hadoop clusters may desire to open one of the other Hadoop clusters. Refer now as well to the example embodiment of FIG. 2. World Wide Hadoop File system client 215 may call open 200 on the World Wide distributed File system 220 with a given domain. Referring now as well to FIG. 3, the WW distributed file system 321 may call domain name node 325 with get domain member locations 305 to find all the members of the domain and to determine the location (cluster and file name) of the domain members. In certain embodiments, the WW Distributed File System may use any number of protocols including remote procedural calls. In other embodiments, the WW distributed file system may support several communication protocols and select the most appropriate protocol based on the network configuration and proximity to the DNN.

Figure 4:
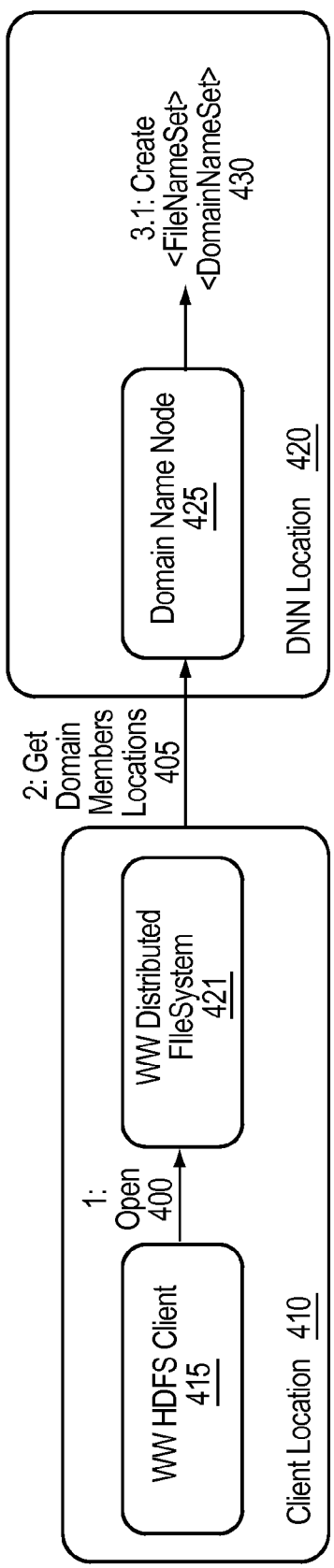
FIG. 4 is a simplified illustration representing finding all members of the domain for the open domain command, in accordance with an embodiment of the present disclosure.
Figure 5:
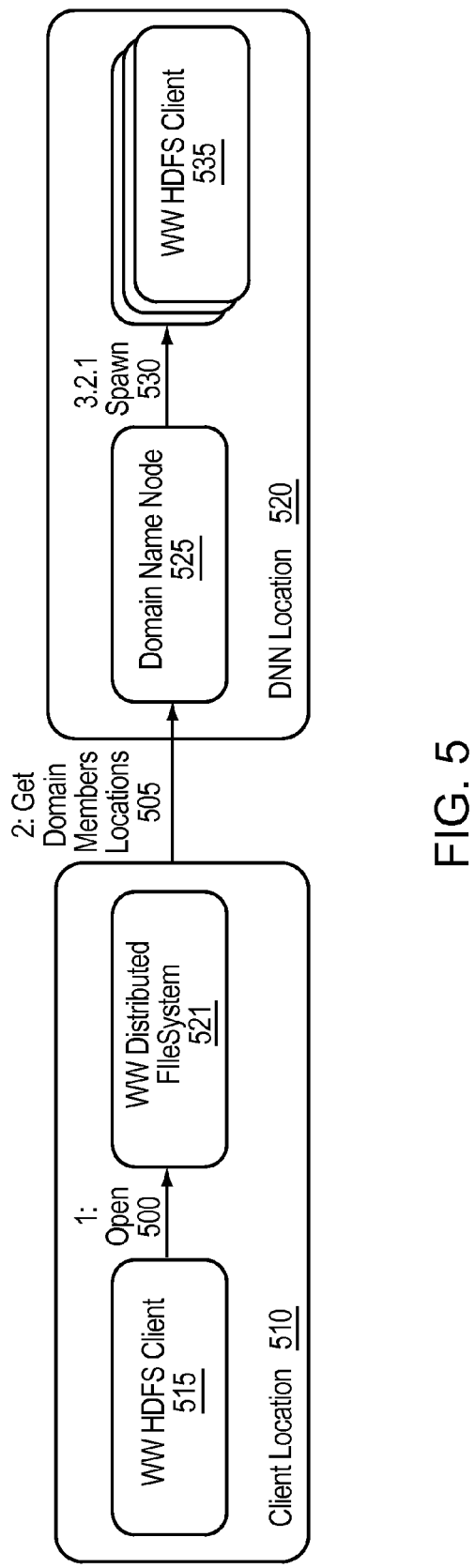
FIG. 5 is a simplified illustration representing getting location for member domains for the open domain command, in accordance with an embodiment of the present disclosure.
Figure 6:
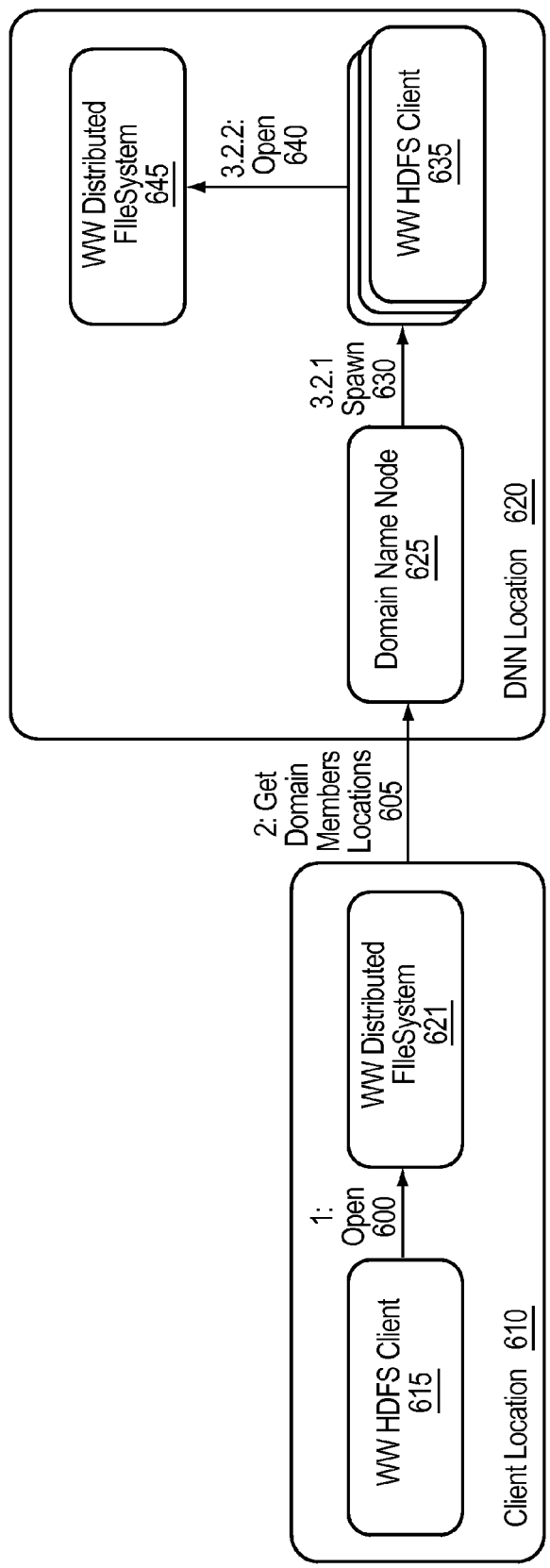
FIG. 6 is an alternative simplified illustration representing getting location for member domains for the open domain command, in accordance with an embodiment of the present disclosure.

Refer now to the example embodiment of FIG. 4. Domain Name node 425 may resolve the domain name and create two sets, file members and domain members (step 430). In certain embodiments, a domain may have other domains as members. Refer now as well to the example embodiment of FIG. 5. For each member in the domain name set, domain name node 525 spawns 530 a WW HDFS client 535. Refer now as well to the example embodiment of FIG. 6. For each WW HDFS Client 6235 created for each member domain in the domain name set, each WW HDFS client 635 may call an open (domain)) 640 to get the WW distributed file system 645.

Figure 7:
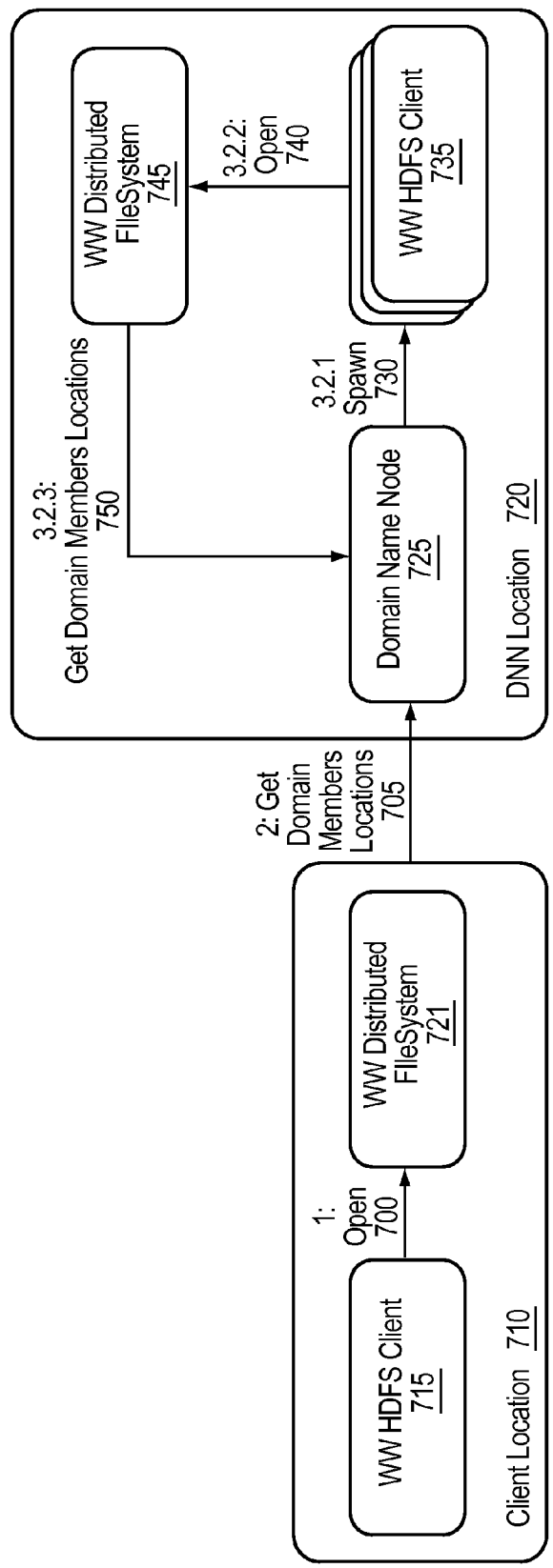
FIG. 7 is a further simplified illustration representing getting location for member domains for the open domain command, in accordance with an embodiment of the present disclosure.

Refer now to the example embodiment of FIG. 7. Distributed File system 745 may call get domain members locations 750 to obtain the WW files names and cluster location lists. In some embodiments, WW file name and Cluster location lists may specify a worldwide address to reach the aforementioned locations. In at least embodiment, for each block location data node list in a block location list, the name node may provide the worldwide address of the data nodes that have a copy of that block. In other embodiments, the data node addresses in the block location data node list may be sorted by their proximity to the client location. In some embodiments, the data node addresses in the block location data node list may be sorted by the proximity to the client location based on the topology of the network.

Figure 8:
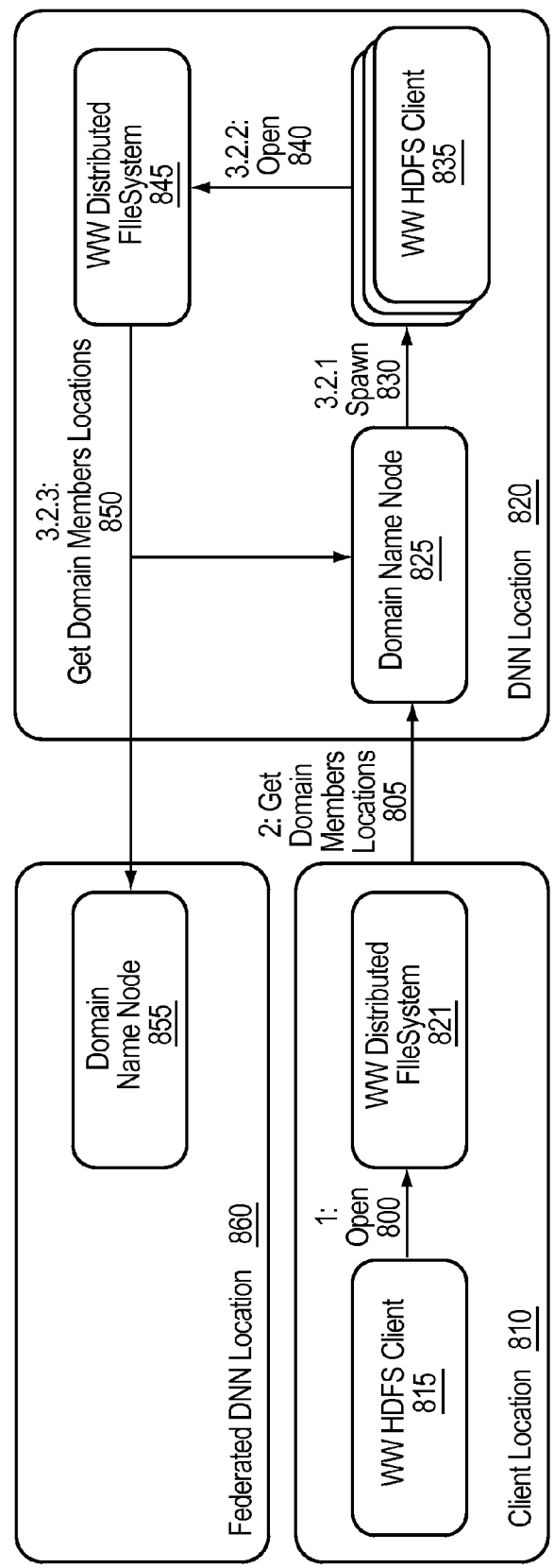
FIG. 8 is an alternative further simplified illustration representing getting location for member domains for the open domain command, in accordance with an embodiment of the present disclosure.

Refer now as well to the example embodiment of FIG. 8. In FIG. 8, get domain member locations 850 has received domain name nodes from federated DNN location 860. In some embodiments, a federated system of domain name nodes is enabled. In certain embodiments, a WW File system requests may be directed to remote DNNs. In further embodiments, configuration parameters may define a list of DNNs.

Figure 9:
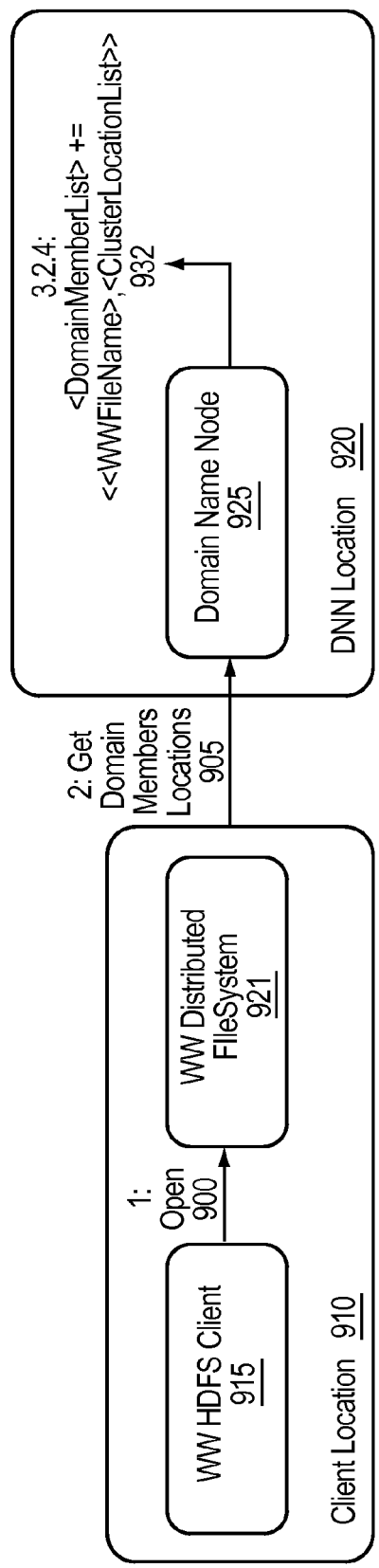
FIG. 9 is simplified illustration representing getting domain locations for members for the open domain command, in accordance with an embodiment of the present disclosure.
Figure 10:
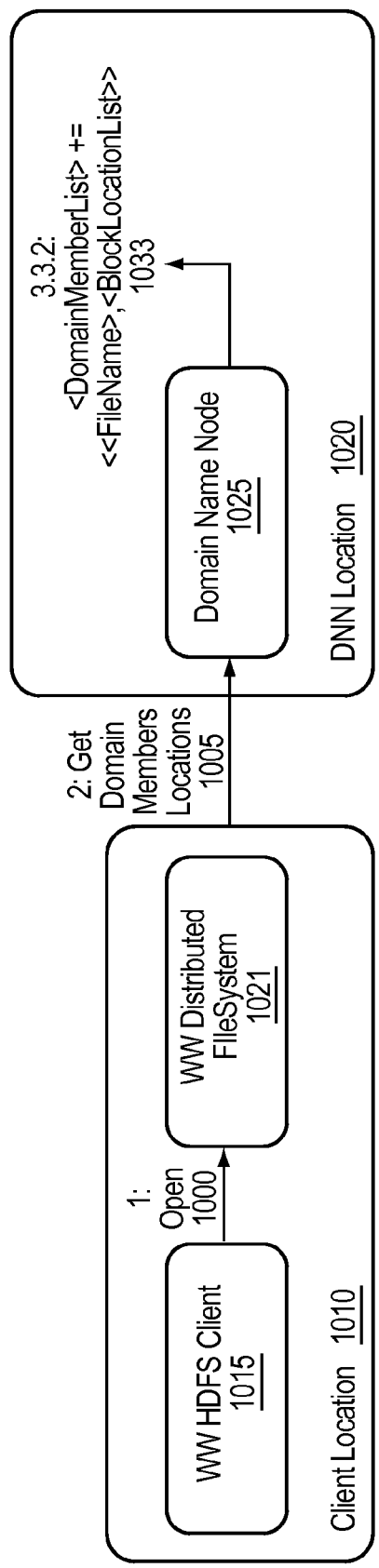
FIG. 10 is simplified illustration representing iterating a member file for each filename set for the open domain command, in accordance with an embodiment of the present disclosure.
Figure 11:
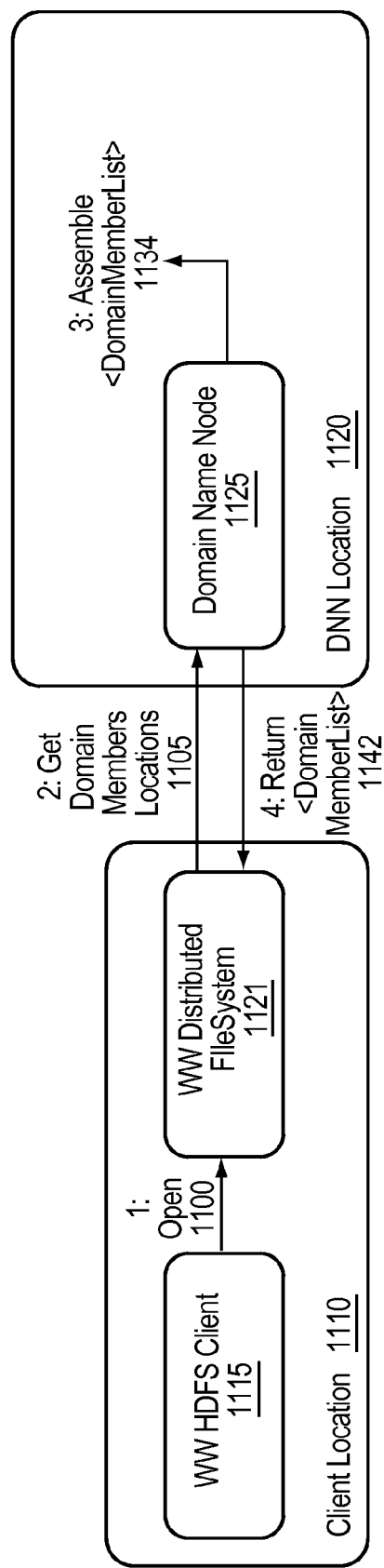
FIG. 11 is simplified illustration representing Returning Member Locations for the open domain command, in accordance with an embodiment of the present disclosure.

Refer now to the example embodiment of FIG. 9. In the example of FIG. 9, for each member domain found in a domain name set, WW HDFS client 915 is spawned. WW HDFS client 915 calls open member domain 900. WW distributed file system 921 calls 905 respective DNN 920. WW File name and cluster location lists are added to the domain member list 932. Refer now as well to the example embodiment of FIG. 10. In this example embodiment, for each member file in a file name set, the file name and block locations are looked up for the member file. The file name and block location list are added to the domain member list. Refer now as well the example embodiment of FIG. 11, where the member locations are returned to the client location. Domain Name Node 1125 returns the final domain member list 1142 to the client location 1110 to WW distributed file system 1121.

Figure 12:
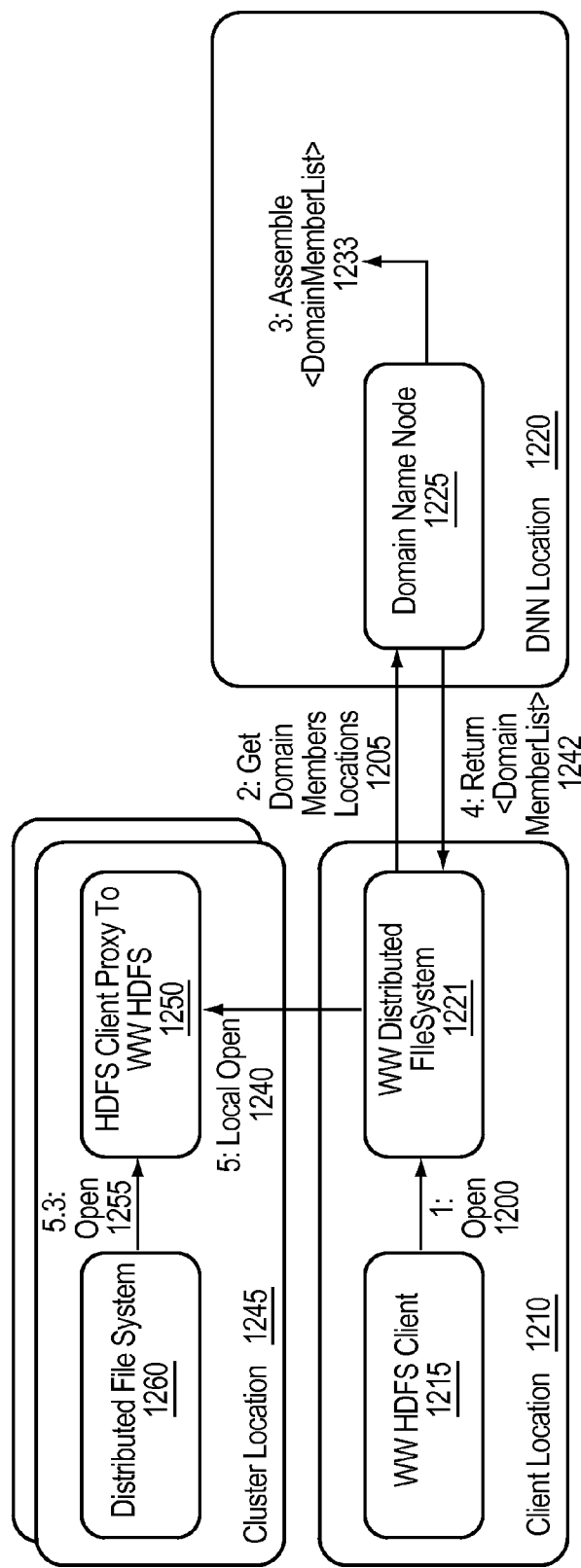
FIG. 12 is simplified illustration representing Calling Open for Domain Members for the open domain command, in accordance with an embodiment of the present disclosure.

Refer now to the example embodiment of FIG. 12. For each WW File name and Cluster location list returned 1242 from Domain name node 1125 to WW Distributed File system 1221, a cluster location, such as cluster location 1245 is selected from cluster location list. A connection is make to HDFS client proxy 1250 on cluster location 1245 and the cluster location is opened 1240. A request is made for HDFS Client 1250 to open 1255 on cluster location 1255 to open WW File name on distributed file system 1260.

Figure 13:
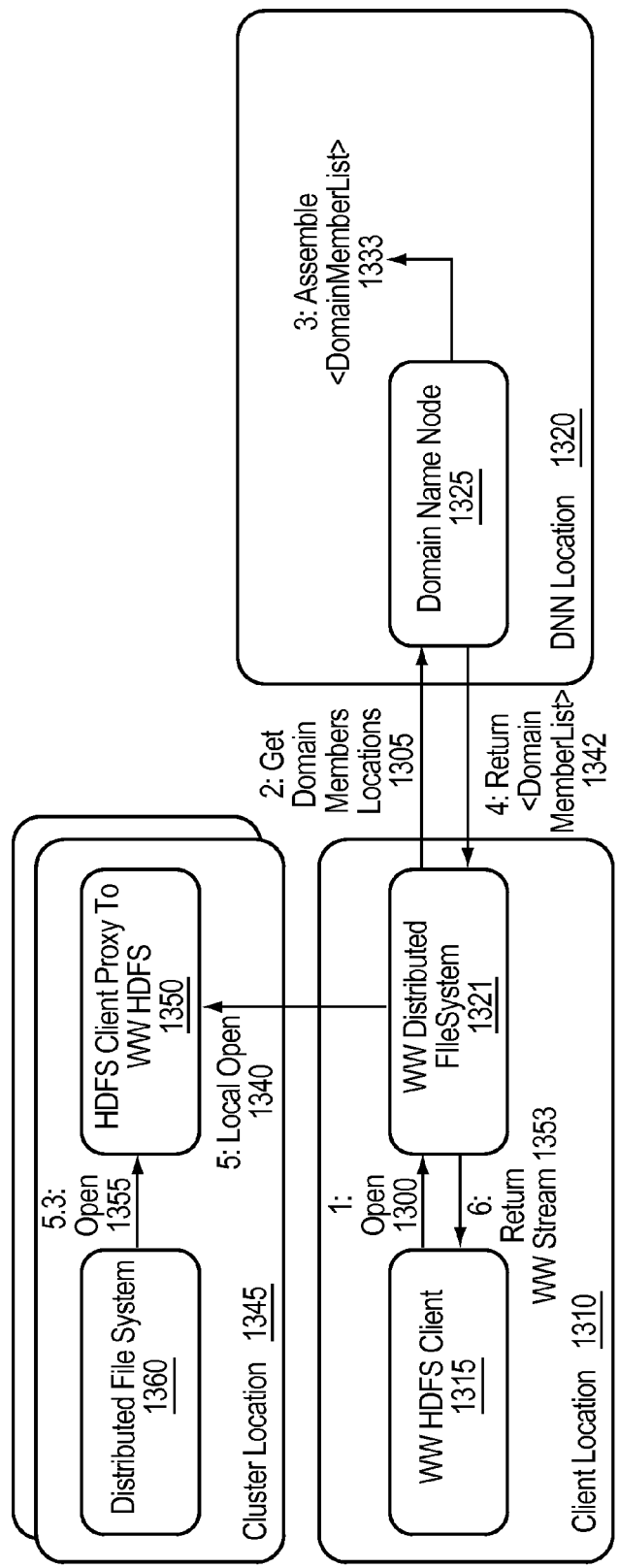
FIG. 13 is simplified illustration representing Returning an WW Input Stream for the open domain command, in accordance with an embodiment of the present disclosure.

Refer now to the example embodiment of FIG. 13. For each cluster location, such as cluster location 1345, selected by WW DFWS 1321, DFS receives input stream 1321 receives an input stream. WW DFS adds the input stream to WW Input stream. WW DFS 1321 returns the WW input stream 1353 to WW HDFS Client 1315.

Figure 14:
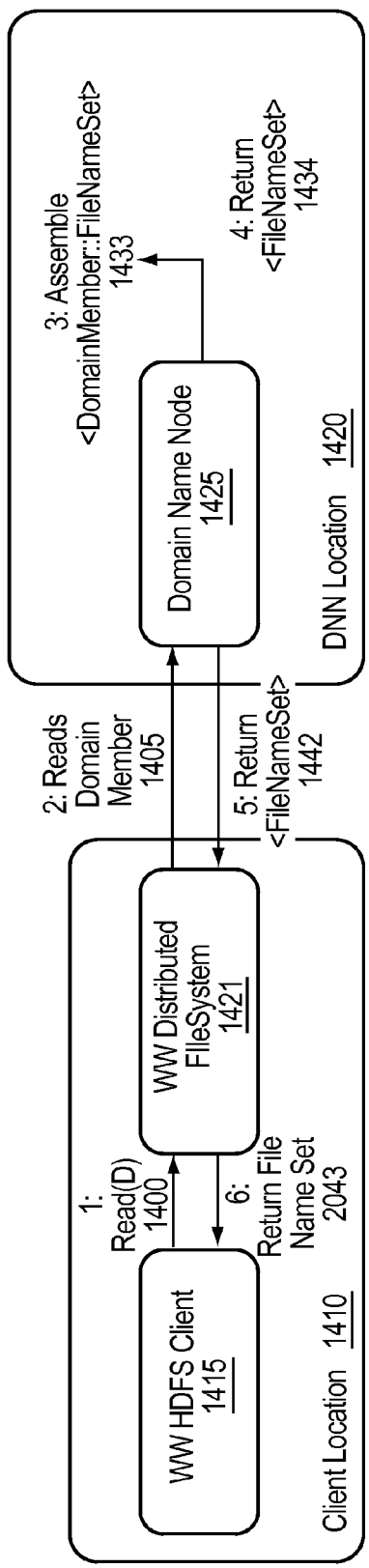
FIG. 14 is simplified illustration representing reading the content of the files in a domain, in accordance with an embodiment of the present disclosure.
Figure 15:
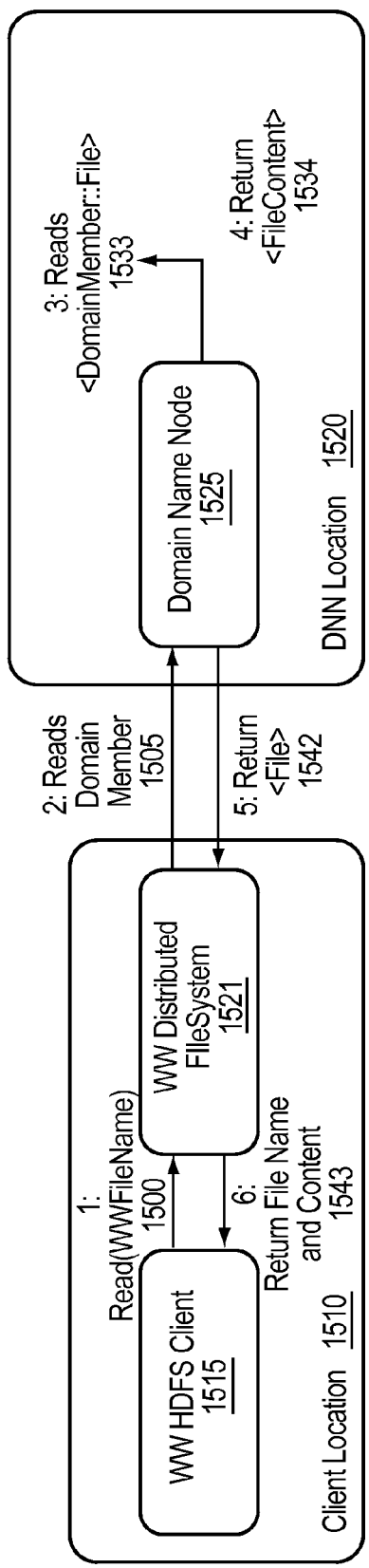
FIG. 15 is a simplified illustration representing a process flow for reading a file name, in accordance with an embodiment of the present disclosure.

Refer now to the example embodiments of FIGS. 14 and 15 which provide an exemplary example of reading the content of the files in a domain. WW HDFS client 1415 reads a domain 1400 from WW distributed file system 1421. WW DFS 1421 reads domain member 1405 from domain name node 1425. Domain node 1425 assembles the list of domain members and file name set 1433, which returns a file name set 1434. Domain name node 1425 of DNN location 1420 returns the file name set 1442 to WW distributed file system 1421. WW DFS 1421 returns the file name set 1443 to WW HDFS Client 1415. For each WW file name, WW HDFS client 1515 sends read WW file name 1500 to WW DFS 1521. WW DFS 1521 sends read domain member 1505 to domain name node 1525. Domain name node 1525 reads domain member file 1533; which returns file content 1534. Domain name node 1525 returns the file 1542 to WW DFS 1521. WW DFS 1521 returns the file name and content 1543 to WW HDFS client 1515.

Figure 16:
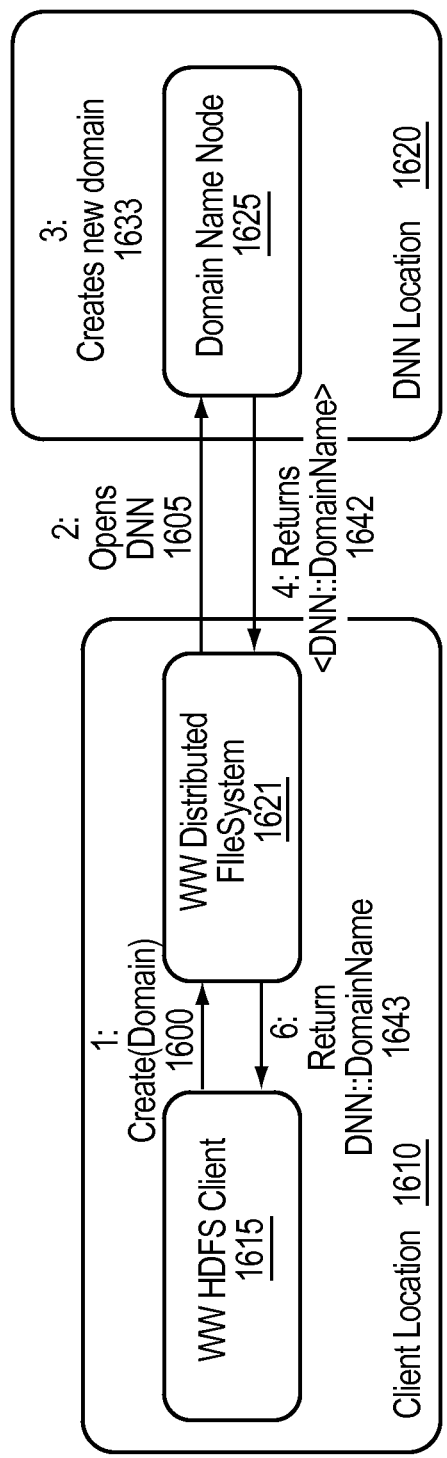
FIG. 16 is a simplified illustration representing a process flow creating a domain, in accordance with an embodiment of the present disclosure.

Refer now to the example embodiment of FIG. 16, which illustrates creating a domain. In the example embodiment of FIG. 16, the create function is used to create a domain in the world wide domain node. In the example embodiment of FIG. 16, create returns a new domain name if the domain is created or null if no domain is created. WW HDFS client 1615 calls create domain 1600 to WW DFS 1621. WW DFS 1621 dens open DNN 1605 to domain name node 1625 at DNN location 1620. Domain name node 1625 creates new domain 1633. Domain name node 1625 returns Domain name 1642. WW DFS 1621 returns domain name 1643 to WW HDFS 1615.

Figure 17:
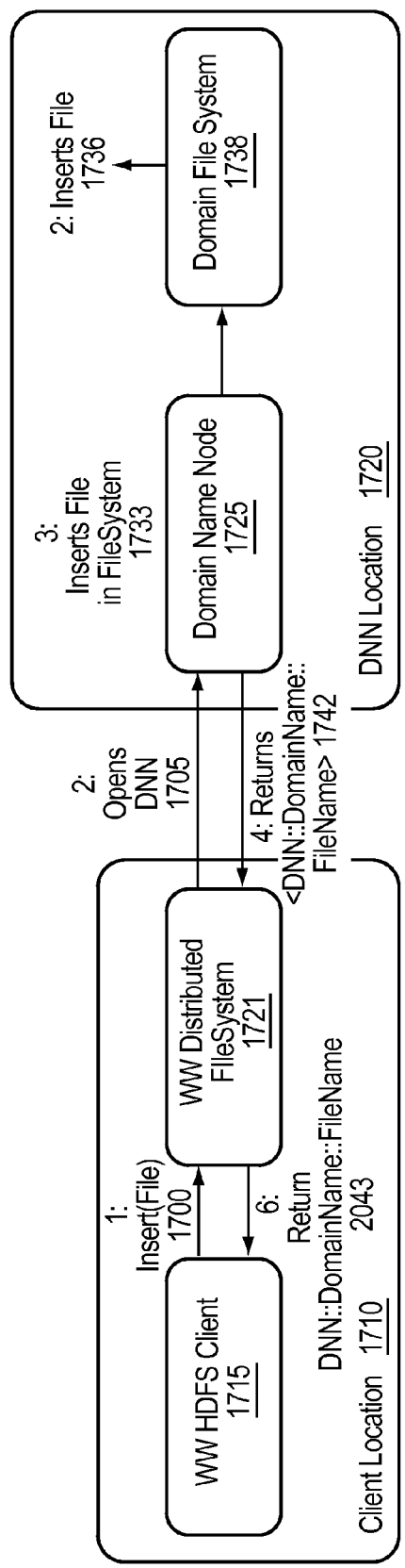
FIG. 17 is a simplified illustration representing a process flow for inserting a file, in accordance with an embodiment of the present disclosure.

Refer now to the example embodiment of FIG. 17, which illustrates inserting a file as member of a domain. In this embodiment, the insert function inserts a file into a domain in a worldwide domain name node. In this embodiment insert returns a new domain file name if the file is created, a null, or a domain name when the file insertion was unsuccessful. WW HDFS client 1715 sends insert file 1700 to WW DFS 1721. WW DFS 1721 sends open DNN 1705 to domain name node 1725. Domain name node 1725 sends insert file in file system 1733 to domain file system 1728. Domain file system 1738 calls insert file 1736. Domain name node 1725 returns the domain name and the file system 1742 to WW Distributed file system 1721. WW DFS 1721 returns the domain name file system to WW HDFS client 1715.

Figure 18:
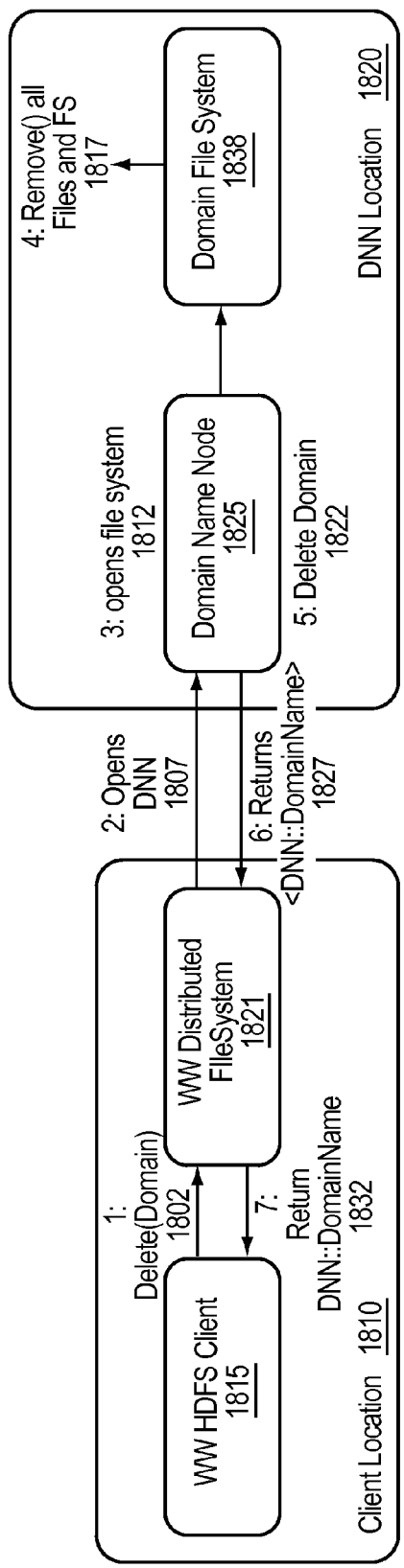
FIG. 18 is a simplified illustration representing a process flow for deleting a domain, in accordance with an embodiment of the present disclosure.

Refer now to the example embodiment of FIG. 18, which illustrates deleting a domain and the files associated with the domain. WW HDFS client 1815 sends delete domain 1802 to WW DFS 1821. WW DFS 1821 sends an open DNN command 1807 to domain name node 1825. Domain dame node opens 1812 domain file system 1838. Domain file system 1838 removes all files and the file system 1817. Domain name node deletes the domain 1822. Domain name node 1825 returns domain name 1827 to WW DFS 1821. WW DFS 1821 returns the deleted domain 1832 to WW HDFS 1815.

Figure 19:
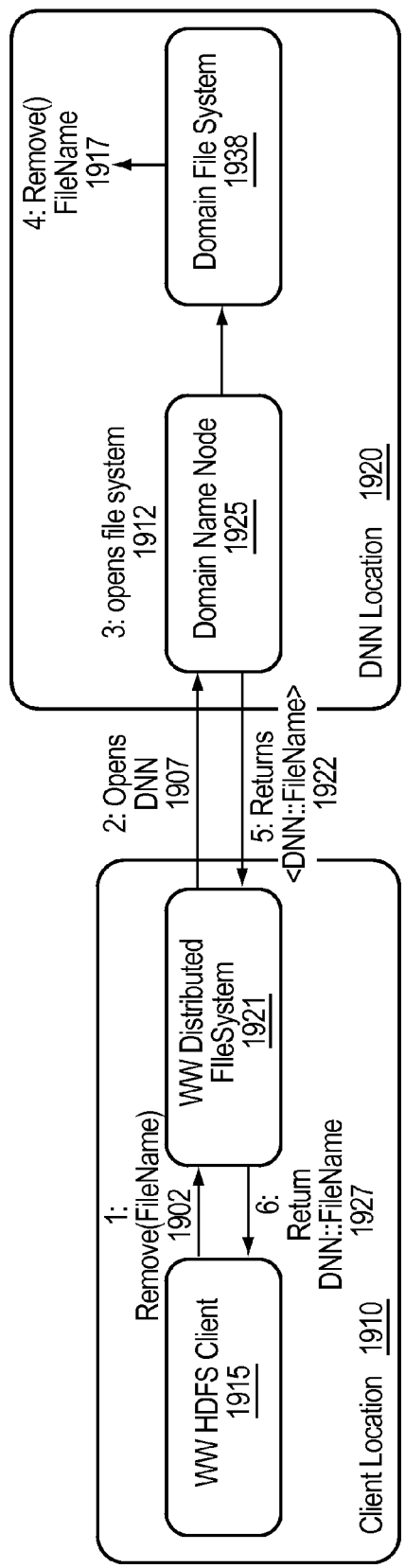
FIG. 19 is a simplified illustration representing a process flow for removing a file name, in accordance with an embodiment of the present disclosure.

Refer now to the example embodiment of FIG. 19, which illustrates removing a file from a domain. WW HDFS Client 1915 sends a delete domain 1902 command to WW distributed file system 1921. WW DFS 1921 sends open DNN 1907 to domain name node 1925. Domain name node 1925 opens 1912 domain file system 1938. Domain file system 1928 removes the file name 1917. Domain name node 1925 returns the file name 1922 to WW DFS 1921. WW DFS 1921 returns the file name 1927 to WW HDFS 1915.

In some embodiments, Client may communicate directly with WW Input Stream returned by a WW DFS as a result of open( ) command. In certain embodiments, a WW FSData Input Stream may use a WW Input Stream as a List of Input Streams for each one of the file members in the Domain. In certain embodiment one WW FS Data input stream may be spawned for each thread. In some embodiments, each thread may act as a proxy client for a cluster location. In at least one embodiment, each thread may read for a cluster. In one embodiment, the thread may get the information and store it locally. In other embodiments, a matrix may be created and each row in the matrix may represent a different file being read.

Figure 20:
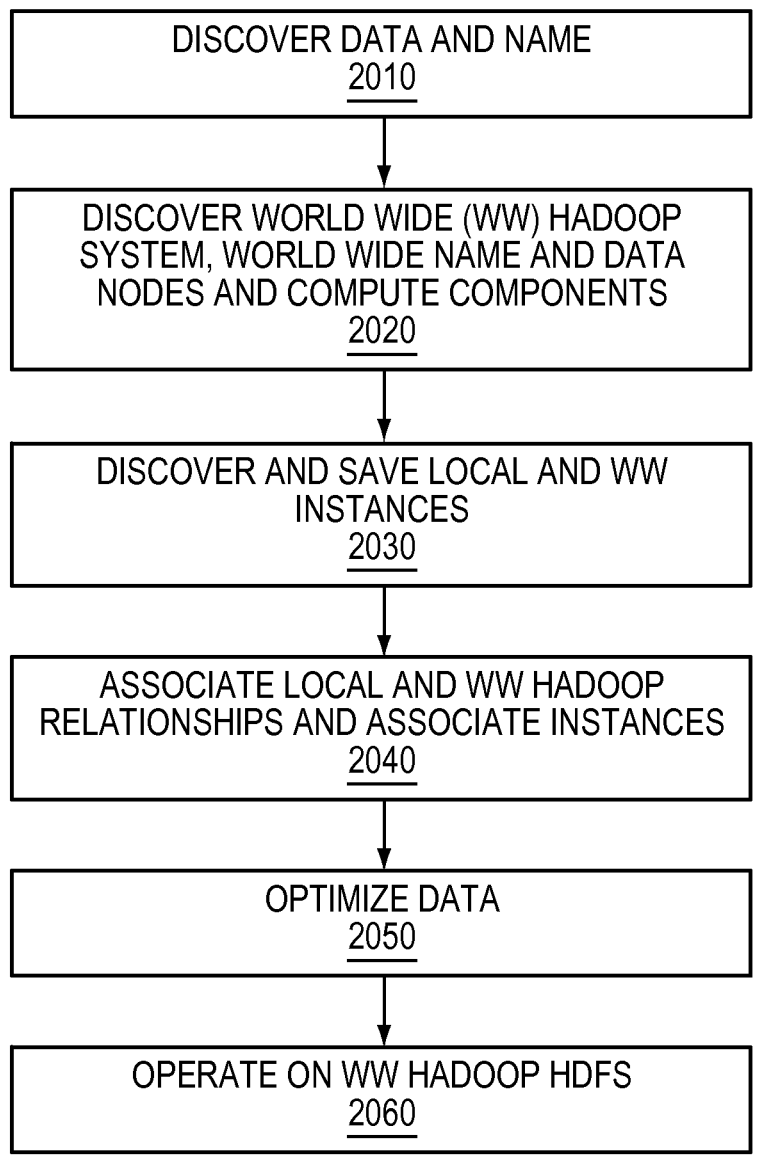
FIG. 20 is a simplified method for discovering information in a system, in accordance with an embodiment of the present disclosure.

Refer now to the example embodiment of FIG. 20. The data and name nodes for a plurality of hadoop domains are determined (step 2010). A World Wide (WW) Hadoop System, World Wide Name and Data Nodes and Compute Components are determined (step 2020). The local and WW instances in the system are discovered and saved in a persistence data base (step 2030). Local and WW Hadoop relationships and associate instances are gathered and set up (step 2040). The data is optimized (step 2050). The WW Hadoop HDFS is operated on an managed using a set of functions (2060).

Figure 21:
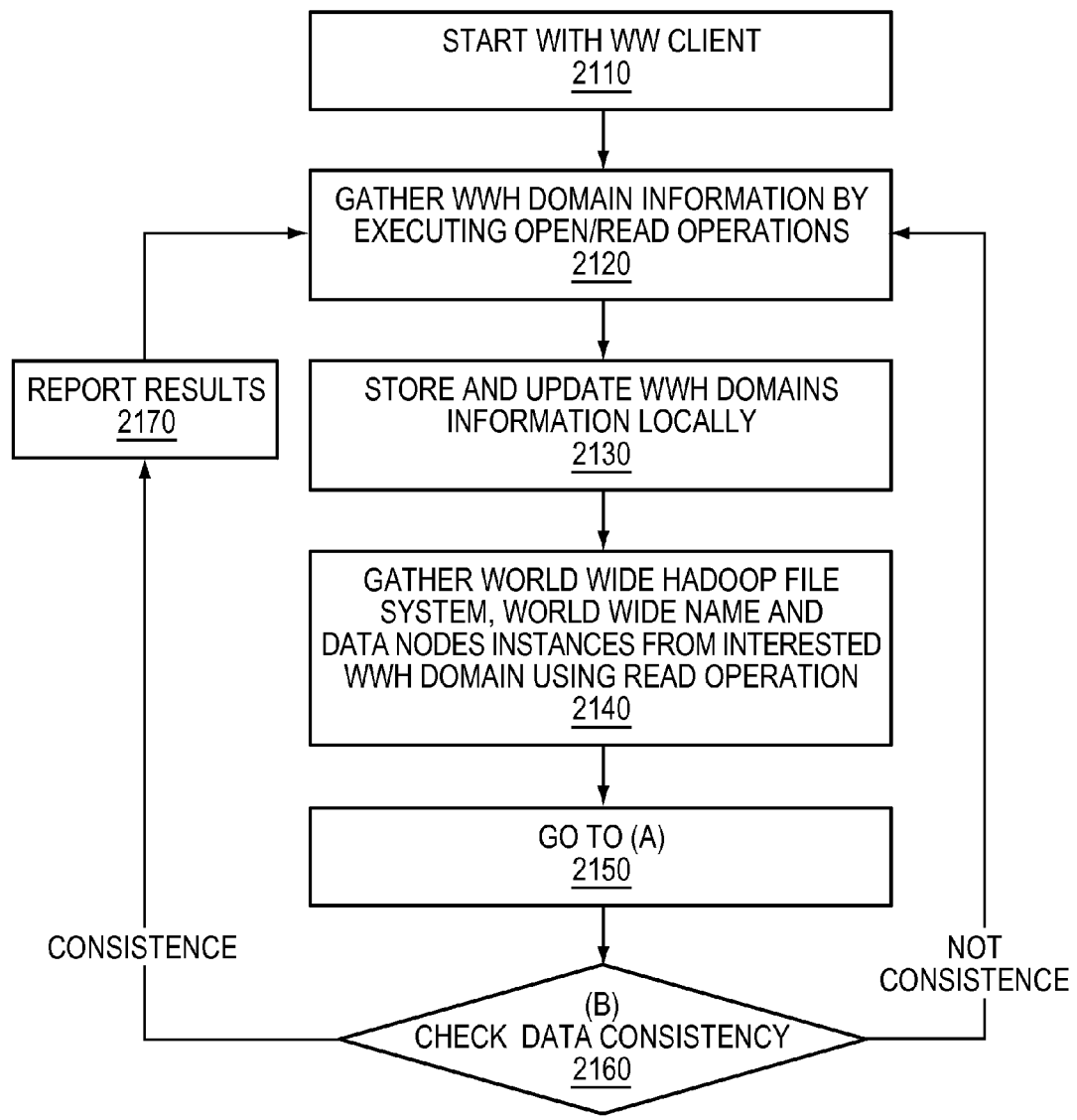
FIG. 21 is a simplified method for gathering information in a system, in accordance with an embodiment of the present disclosure.
Figure 22:
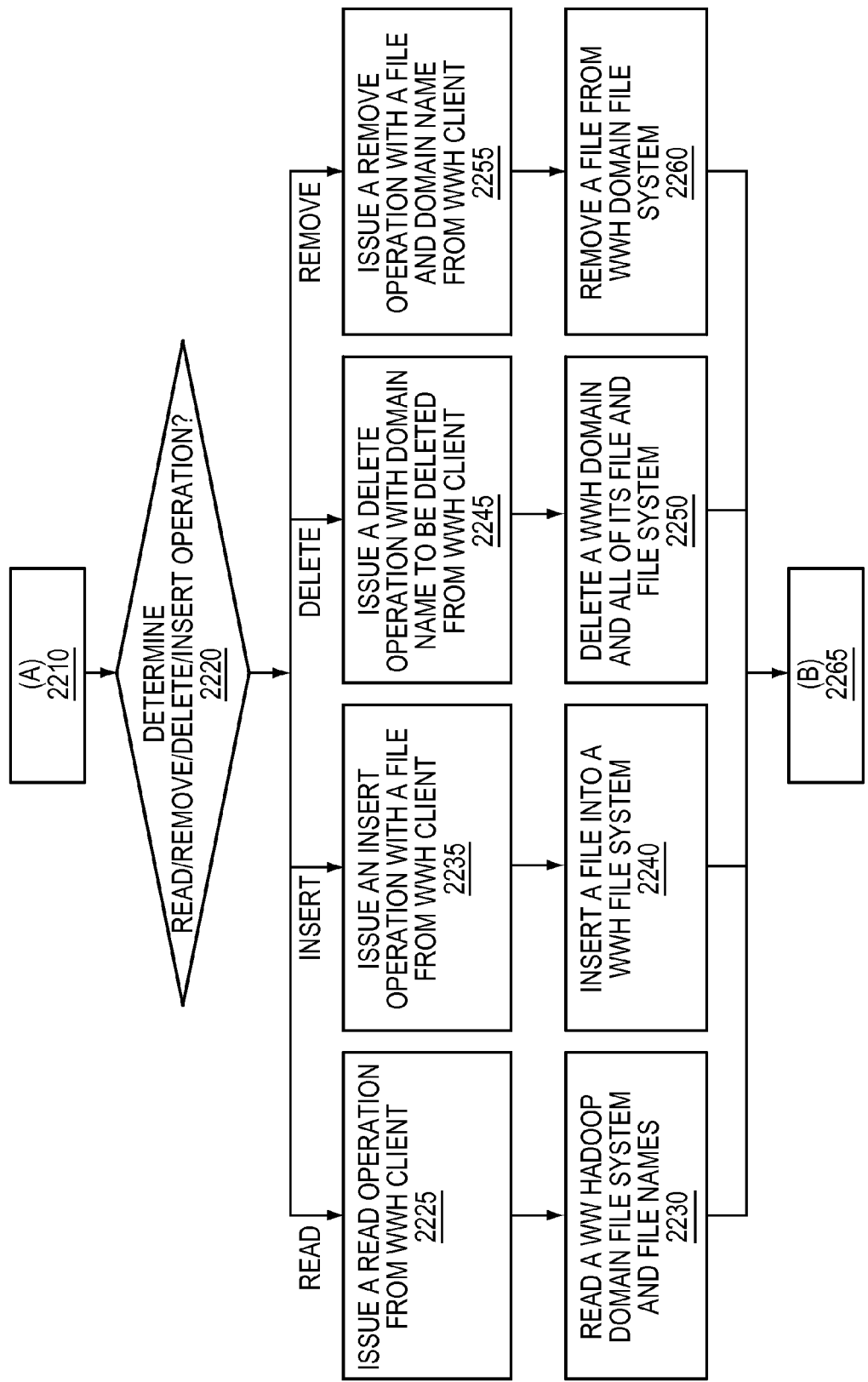
FIG. 22 is a simplified method for running commands, in accordance with an embodiment of the present disclosure.

Refer now to the example embodiment of FIGS. 21 and 22. In the example embodiment of FIG. 21, the WWH domain information is gathered using open and read operations (step 2120). The WWH domain information is stored (step 2130). The WW Hadoop file system, WW Name and Data node instances are gathered from the WWH domain (step 2140). A determination is made whether there is a read command, a remove command, or an insert command (step 2220). If the command is a read command, a read operation is issued from the WWH client (Step 2225) and the WW Hadoop Domain file system and file system names are read (Step 2230). If the command is an insert command, an insert operation is issued from the WWH client (Step 2235) and a file is inserted into a WWH file system (Step 2240). If the command is a delete command, a delete operation is issued from the WWH client (Step 2245) and the WW Hadoop Domain file system and the files of the system names are deleted (Step 2250). If the command is a remove command, a remove operation is issued from the WWH client (Step 2255) and a file is removed from the WW Hadoop Domain file system (Step 2260).

WW Execution Framework and Processing

In certain embodiments, Shared Nothing, Massive Parallel Processing (MPP) activities may be executed on a world wide scale. In some embodiments, the current disclosure provides a workflow to provide coordination and orchestration of activities in a world wide scale.

In some embodiments, the current disclosure enables an implementation workflow for the execution of a World Wide Job. In an embodiment, the current disclosure enables a client to connecting with a World Wide Job Tracker to initiate the execution of a World Wide Job. In certain embodiments, a World Wide Job Tracker may initiate the execution of World Wide Tasks and may monitor the task execution. In other embodiments, a World Wide Job Tracker may communicate with World Wide Tasks Trackers. In further embodiments, World Wide Task Trackers may trigger execution of World Wide Tasks. In at least one embodiment, World Wide Job Trackers and World Wide Task Trackers may communicate with each other to report on status, monitor activities, exchange parameters, communicating and aggregating results. In most embodiments, this disclosure may interact with Hadoop.

Figure 23:
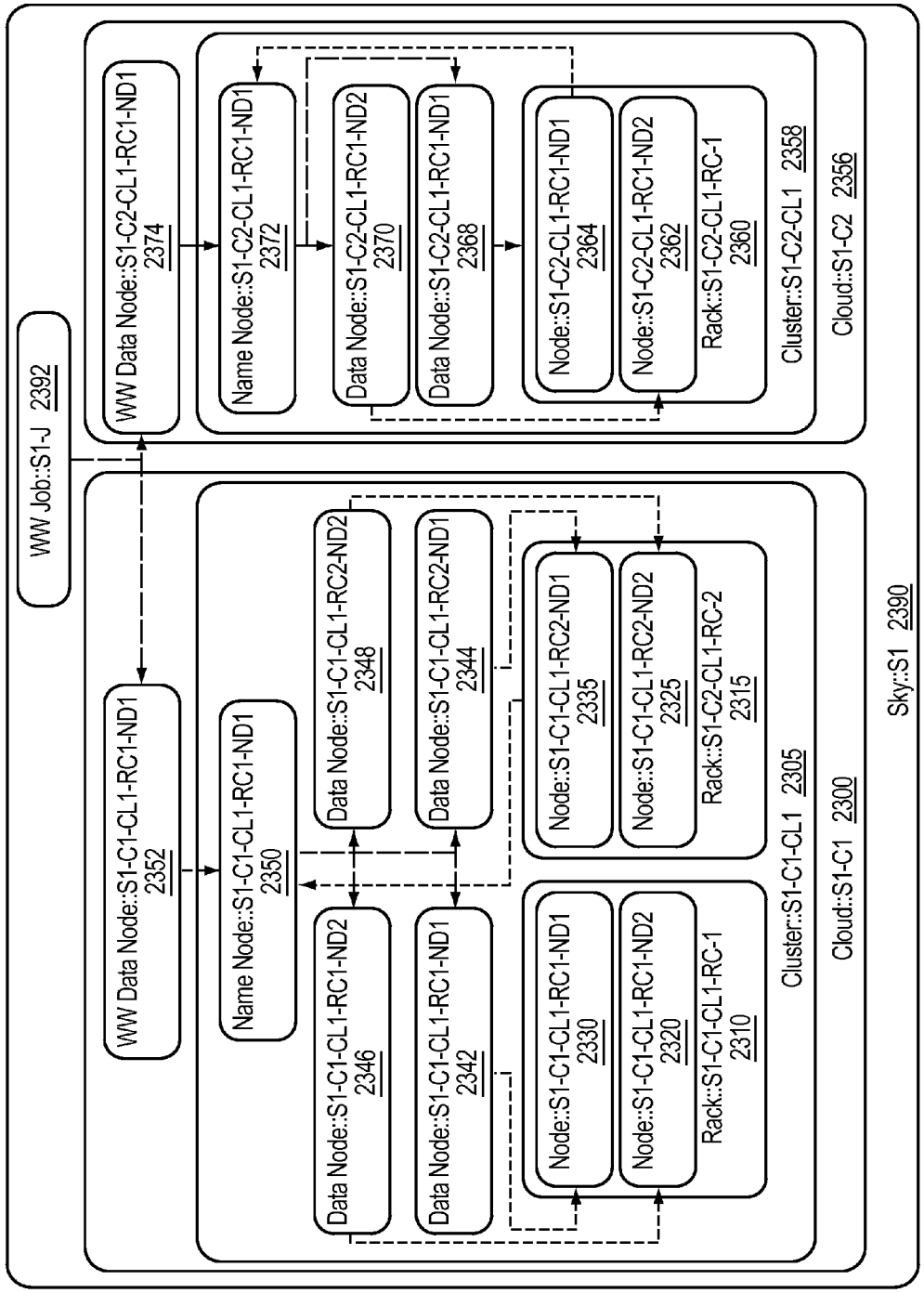
FIG. 23 is a simplified illustration representing Relationships Between Cloud And WW Entities, in accordance with an embodiment of the present disclosure.

Refer now to the example embodiment of FIG. 23, which illustrates a sample relationship between Cloud and WW entities. Sky 2390 contains two clouds, cloud 2365 and cloud 2300, and WW JOB 2392. Cloud 2300 contains of Cluster 2305 and WW Data node 2353. Cluster 2305 contains of four data nodes, 2342, 2344, 2346, and 2346. Cluster 2305 also contains name node 2350. Cluster 2305 also contains racks 2310 and 2315. Each rack, such as 2310 contains nodes, such as nodes 2320 and 2330. Data node 2346 is assumed by node 2320. Data node 2342 is assumed by node 2330. Data node 2348 is assumed by node 2325. Data node 2344 is assumed by node 2335. Node 2335 is assumed by name node 2350. Data node 2346 tracks data node 2348 and vice versa. Data node 2342 tracks data node 2344 and vice versa. WW Data node 2352 tracks Name node 2350.

Cloud 2356 contains cluster 2358 which contains name node 2372 and WW Data Node 2374. WW Data node 2374 is tracked by WW Data node 2352 and vice versa. WW Data Node 2353 and WW data node 2374 are tracked by WW Job 2392. Cluster 2358 has name node 2372, data node 2370, and data node 2368, and rack 2360. Rack 2360 has node 2364 and node 2362. Name node 2372 is tracked by WW data node 2374. Data node 2370 and data node 2368 are tracked by name node 2372. Name node 2372 is tracked by node 2364. Node 2362 is tracked by data node 2370.

Figure 24:
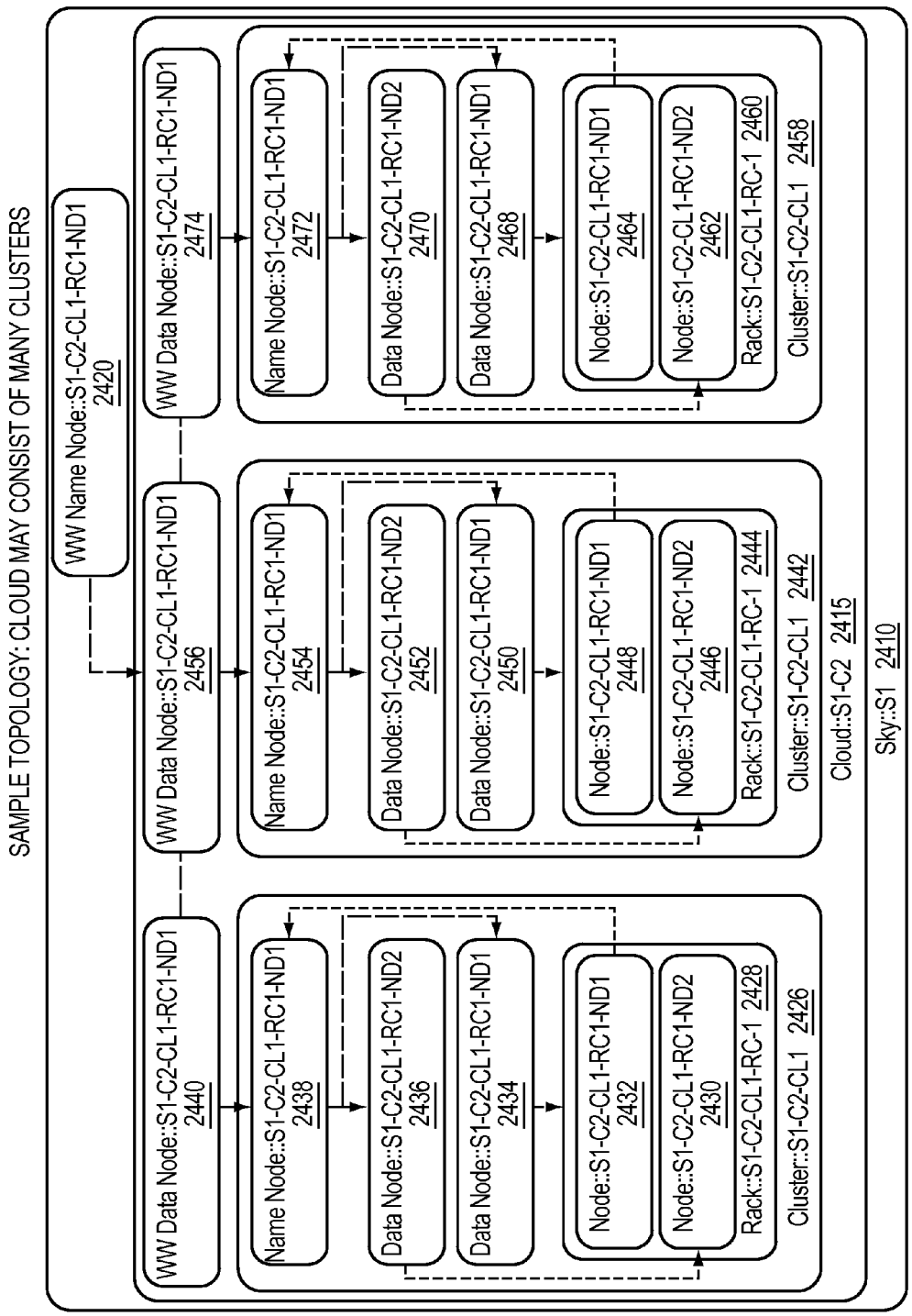
FIG. 24 is a simplified illustration representing a Sample Topology Where a Cloud May Have Many Clusters, in accordance with an embodiment of the present disclosure.

Refer now to the example embodiment of FIG. 24, which illustrates a sample topology of a cloud with multiple clusters. Sky 2410 contains Cloud 2415 and WW Name node 2420. Cloud 2415 contains WW data node 2440, WW data node 2456, WW data node 2474, cluster 2426, cluster 2442 and cluster 2458. Cluster 2458 contains name node 2472 and WW Data Node 2474. WW Data node 2474 is tracked by WW Data node 2452 and vice versa. WW Data Node 2453 and WW data node 2474 are tracked by WW Job 2492. Cluster 2458 has name node 2472, data node 2470, and data node 2468, and rack 2460. Tack 2460 has node 2464 and node 2462. Name node 2472 is tracked by WW data node 2474. Data node 2470 and data node 2468 are tracked by name node 2472. Name node 2472 is tracked by node 2464. Node 2462 is tracked by data node 2470. Cluster 2426 and Cluster 2442 contain similar elements and relationships as cluster 2458. WW data node 2440 tracks cluster 2426 via name node 2438. WW data node 2456 tracks cluster 2442 via name node 2454. WW data node 2444 tracks cluster 2458 by name node 2472.

In some embodiments a WW Name Node may serve a Domain, while Name Node may serve a File. In other embodiments, a WW Name Node may track WW Data Nodes. In at least some embodiments, a WW Data Nodes may track Name Nodes, and Name Nodes may track Data Nodes.

FIG. 25

Figure 25:
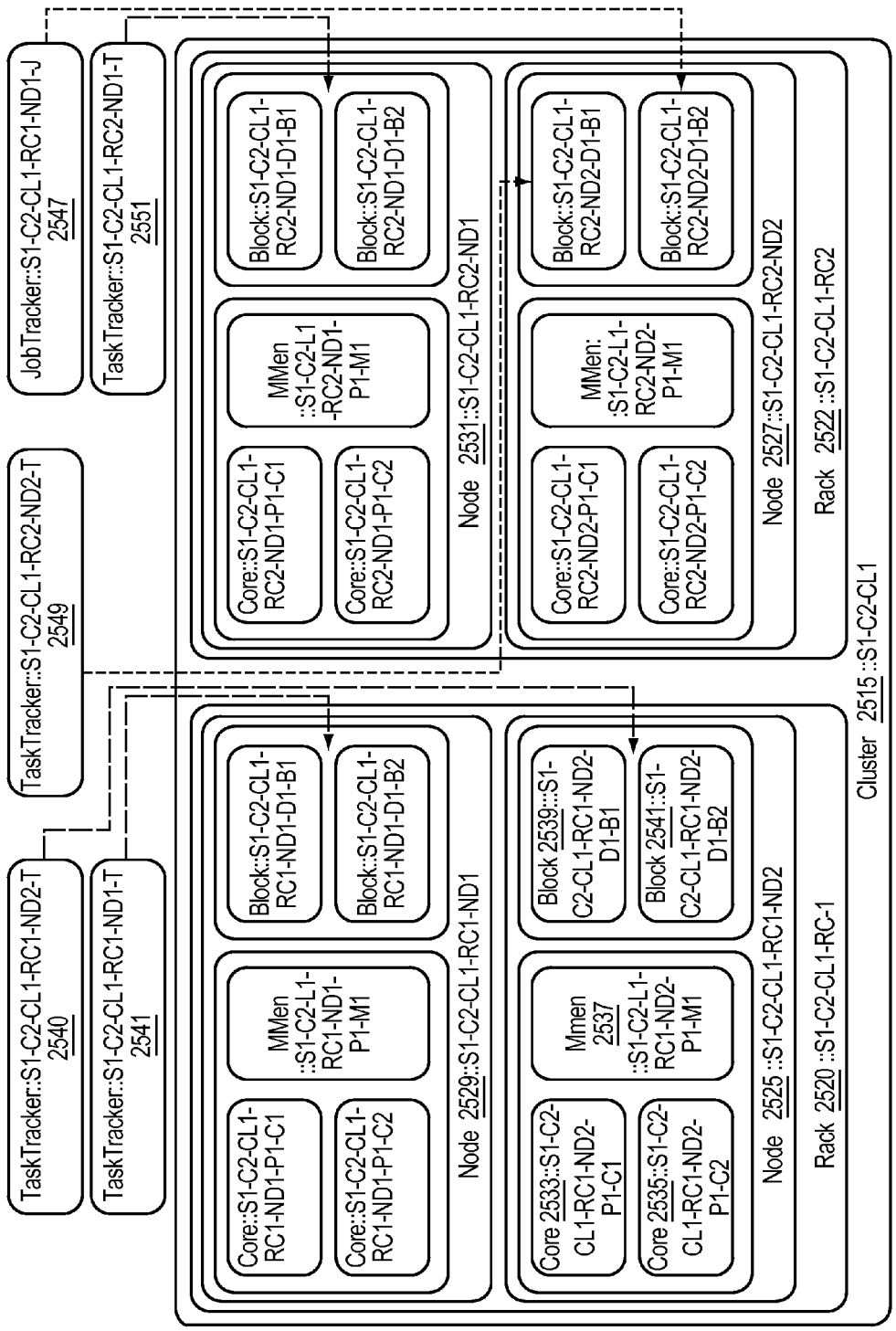
FIG. 25 is a simplified illustration representing a cluster, rack, notes, task tracker, and a job tracker, in accordance with an embodiment of the present disclosure.

Refer now to the example embodiment of FIG. 25. In this embodiment, Task Trackers 2540, 2541, 2547, 2549, and 2551 are mapped to blocks on nodes 2529, 2525, 2531, and 2527. Each of the nodes, 2529, 2531, 2525, and 2527, are located in a rack such as rack 2520 and 2522. Each rack 2520 and 2522 are located in cluster 2515.

FIG. 26

Figure 26:
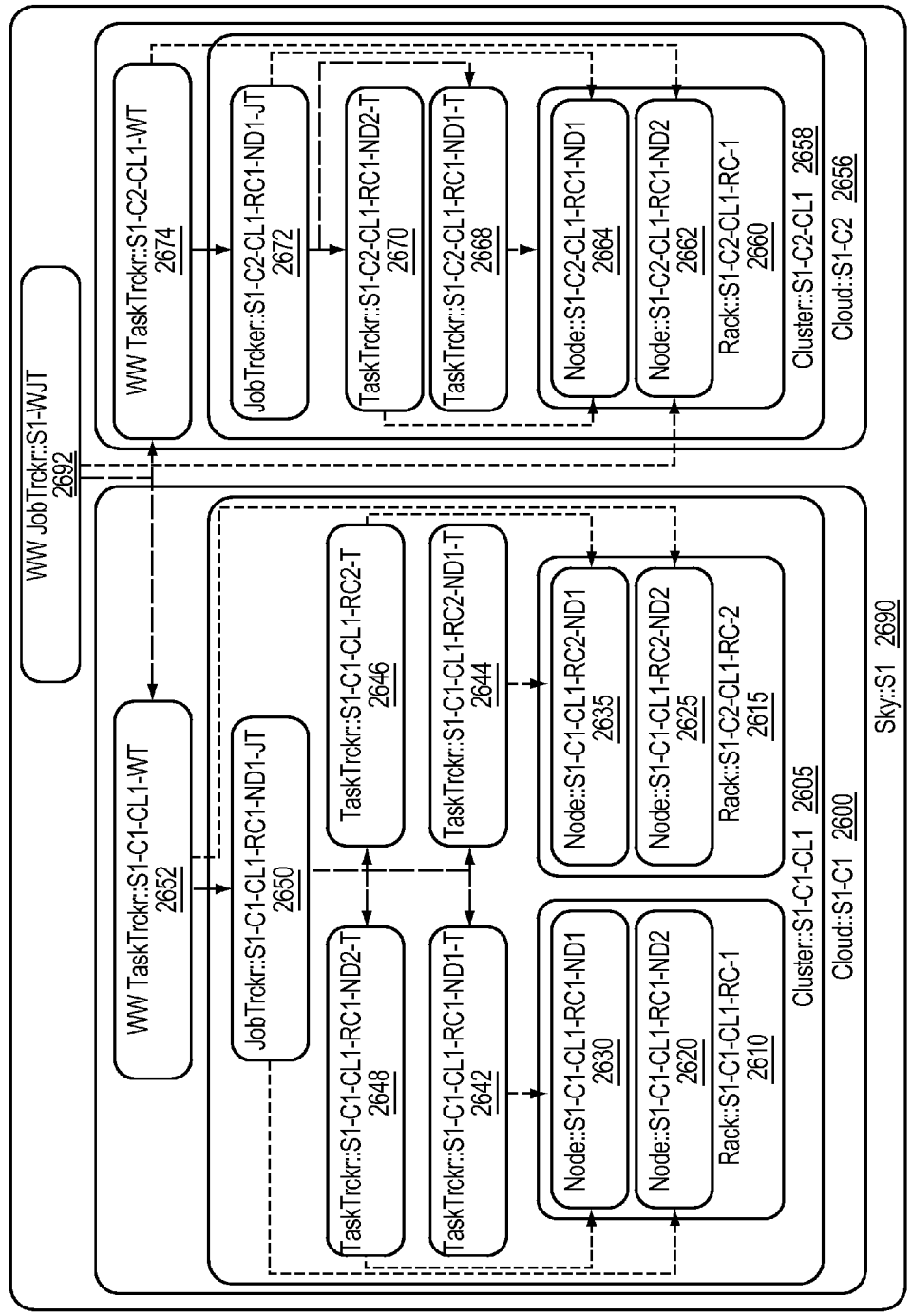
FIG. 26 is a simplified illustration representing a Sample Topology for WW Job Tracker and WW Task Tracker, in accordance with an embodiment of the present disclosure.

Refer now to the example embodiment of FIG. 26, which illustrates a sample topology for WW job tracker and WW task tracker. Sky 2690 contains two clouds, cloud 2665 and cloud 2600, and WW Job tracker 2692. Cloud 2600 contains of Cluster 2605 and WW Task Tracker 2653. Cluster 2605 contains of four task trackers, 2642, 2644, 2646, and 2646. Cluster 2605 also contains Job tracker 2650. Cluster 2605 also contains racks 2610 and 2615. Each rack, such as 2610 contains nodes, such as nodes 2620 and 2630. Task Tracker 2646 is assumed by node 2620. Task Tracker 2642 is assumed by node 2630. Task Tracker 2648 is assumed by node 2625. Task Tracker 2644 is assumed by node 2635. Node 2635 is assumed by Job Tracker 2650. Task Tracker 2646 tracks data node 2648 and vice versa. Task Tracker 2642 tracks data node 2644 and vice versa. WW Task Tracker 2652 tracks Job Tracker 2650

Cloud 2656 contains WW Task Tracker 2674 and cluster 2658 which contains Job Tracker 2672. WW Task Tracker 2674 is tracked by WW task tracker 2652 and vice versa. WW Task Tracker 2652 and WW Task Tracker 2674 are tracked by WW Job Tracker 2692. Cluster 2658 has Tracker 2672, Task Tracker 2670, and Task Tracker 2668, and rack 2660. Rack 2660 has node 2664 and node 2662. Job Tracker 2672 is tracked by WW Task Tracker 2674. Task Tracker 2670 and Task Tracker 2668 are tracked by Job Tracker 2672. Job Tracker 2672 is tracked by node 2664. Node 2662 is tracked by Task Tracker 2670.

Figure 27:
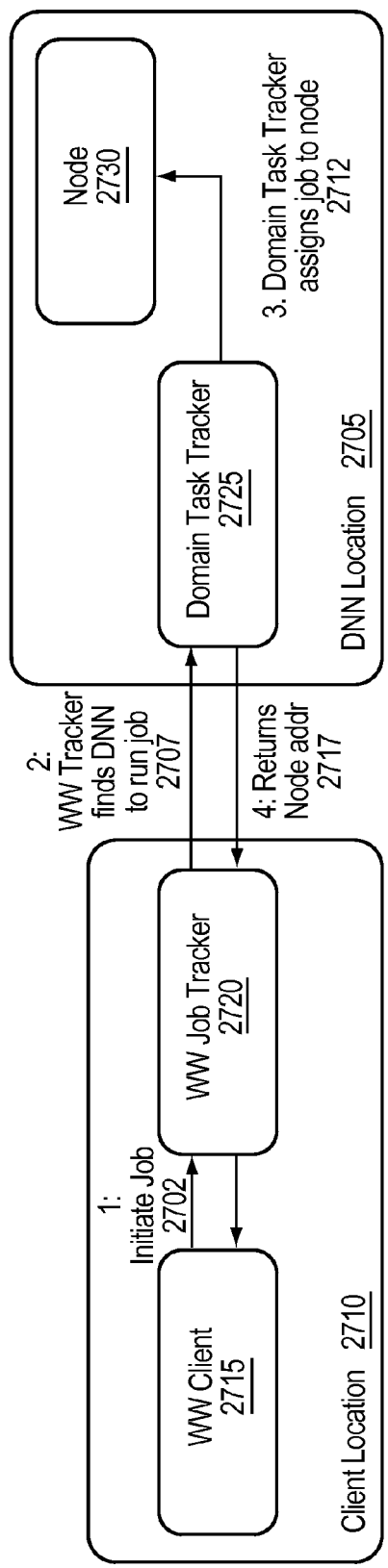
FIG. 27 is a simplified method for running a job, in accordance with an embodiment of the present disclosure.

Refer now to the example embodiment of FIG. 27, which illustrates a client connecting with a WW job tracker to initiate the execution of a World Wide Job. WW Client 2715 sends initiate job to WW Job tracker 2720. WW Job tracker 2720 finds DD to run job 2703. Domain name tracker 2725 assigns job to node 2730. Domain task tracker 2725 returns node address to WW Job tracker 2720. WW Job tracker 2720 returns address to WW Client 2715.

Figure 28:
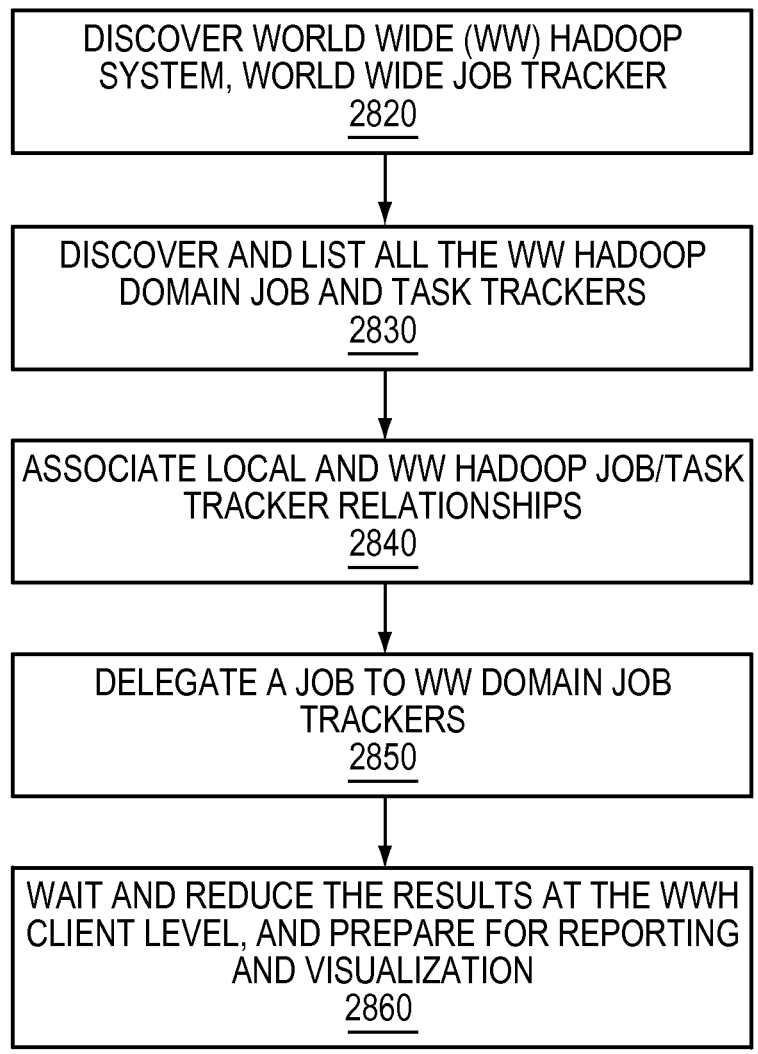
FIG. 28 is a simplified method for discovering trackers, in accordance with an embodiment of the present disclosure.

Refer now to the example embodiment of FIG. 28, which illustrates a process that may be administered by a WWH client administrator. A World Wide (WW) Hadoop System and World Wide Job Tracker are discovered (step 2820). The WW Hadoop Domain Job and Task trackers are discovered and listed (step 2830). WW Hadoop job/task tracker relationships are associated (step 2840). A job is delegated to WW Domain Job Trackers (step 2850). The results are reduced at the WWH client level, and prepare for reporting and visualization (step 2860).

Figure 29:
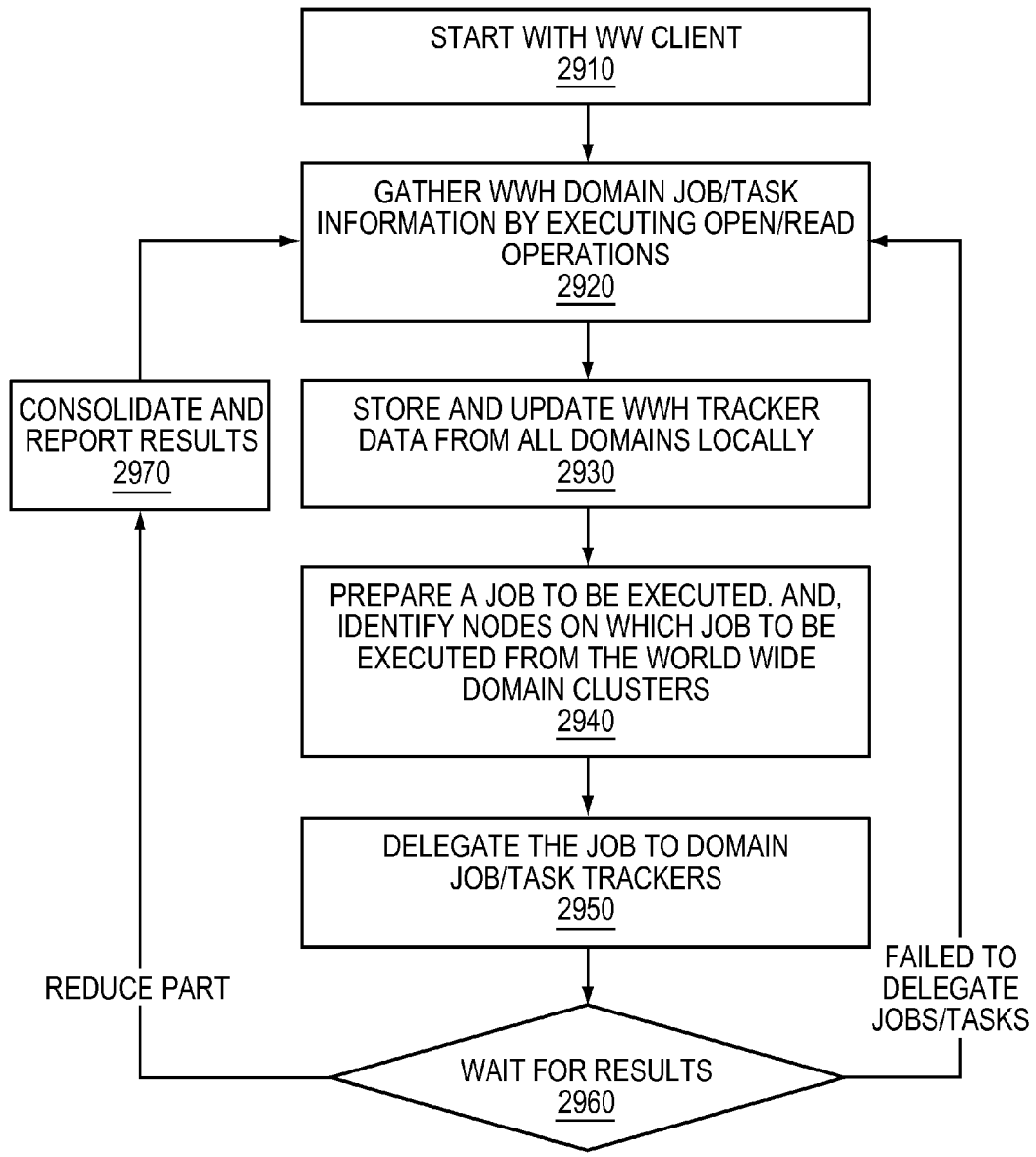
FIG. 29 is a simplified method for executing a job, in accordance with an embodiment of the present disclosure.

Refer now to the example embodiment of FIG. 29. For a given WW client (step 2910), WWH domain/job/task information is gathered by executing open read operations (step 2920). WWH tracker data is stored and updated from local domains (Step 2930). A job is prepared an identified on which nodes the job is to be executed from the world wide domain clusters (step 2940). The job is delegated to the job/task trackers (step 2950). Results are polled (step 2960). Results are consolidated and reported (step 2970).

Figure 30:
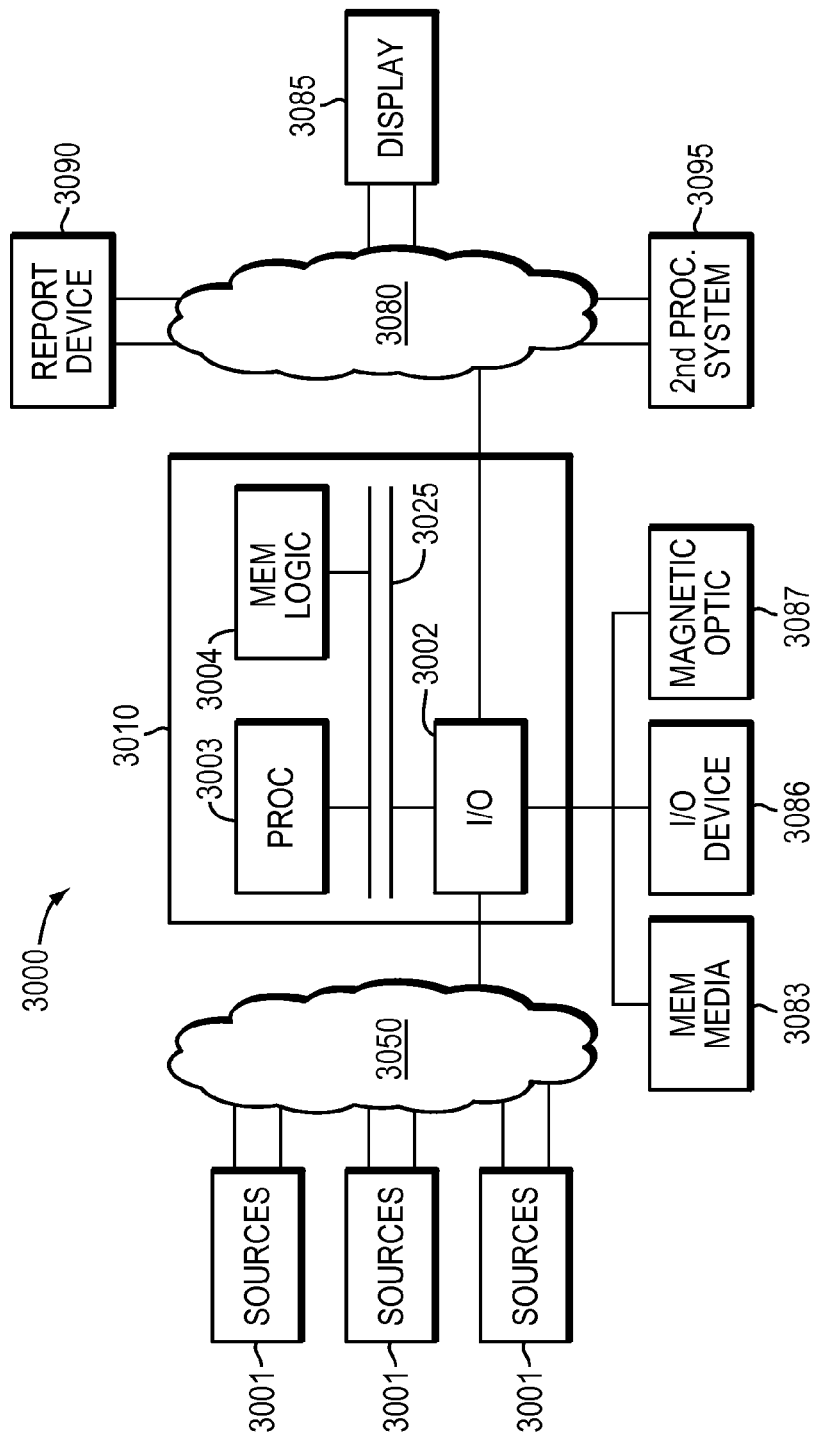
FIG. 30 is an example of an embodiment of an apparatus that may utilize the techniques described herein, in accordance with an embodiment of the present disclosure.
Figure 31:
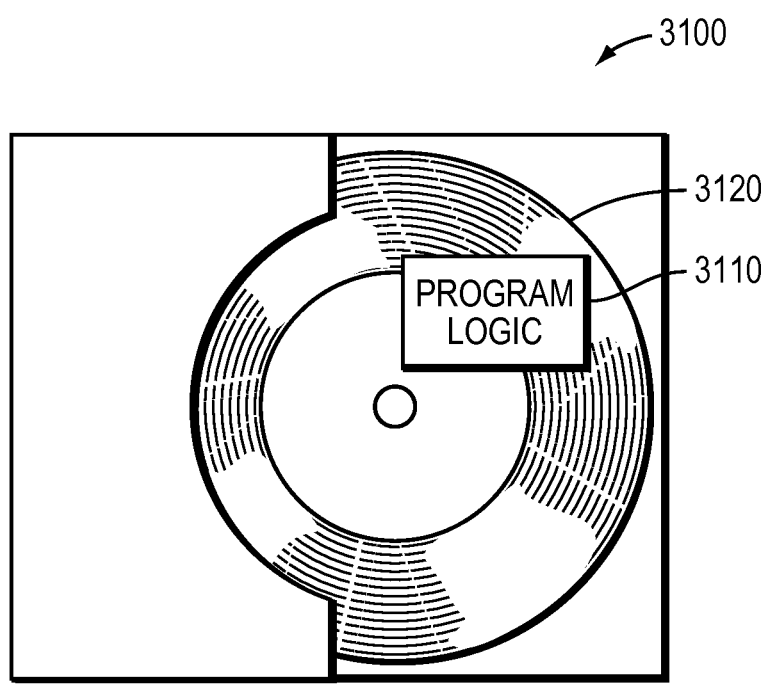
FIG. 31 is an example of an embodiment of a method embodied on a computer readable storage medium that may utilize the techniques described herein, in accordance with an embodiment of the present invention.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 30, the machine becomes an apparatus for practicing the invention. When implemented on one or more general-purpose processors, the program code combines with such a processor 3003 to provide a unique apparatus that operates analogously to specific logic circuits. As such a general purpose digital machine can be transformed into a special purpose digital machine. FIG. 31 shows Program Logic 3134 embodied on a computer-readable medium 3130 as shown, and wherein the Logic is encoded in computer-executable code configured for carrying out the reservation service process of this invention and thereby forming a Computer Program Product 3100. The logic 3034 may be the same logic 3040 on memory 3004 loaded on processor 3003. The program logic may also be embodied in software modules, as modules, or as hardware modules.

The logic for carrying out the method may be embodied as part of the system described below, which is useful for carrying out a method described with reference to embodiments shown in, for example, FIG. 12 and FIG. 15. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer implemented method for tracking execution commands in a parallel processing network, the parallel processing network having network nodes, the network nodes grouped into clusters, the method comprising:
representing a worldwide job tracker; and
representing worldwide task trackers, the worldwide task trackers communicatively coupled to the worldwide job tracker, wherein the worldwide job tracker is enabled to execute a worldwide job by distributing the worldwide job across the worldwide task trackers to the clusters, wherein each of the clusters is enabled to use the network nodes of each respective cluster to perform parallel processing, wherein each cluster is enabled to contain data; wherein each of the clusters has a mapping structure mapping out the distribution of the data of the cluster; wherein the parallel processing network has a worldwide mapping structure mapping over the mapping structure of each cluster to create a map of the data in each of the other clusters to enable a worldwide view of the data in each of the clusters and enable operations to be performed on each of the clusters; wherein the worldwide mapping structure denotes location of the data in each of the nodes in each of the clusters; wherein each of the worldwide task trackers is enabled to monitor processing of a portion of the worldwide job distributed to each respective cluster, wherein the worldwide job tracker enables orchestration between the clusters to execute the worldwide job and wherein the worldwide mapping structure enables the worldwide job to be distributed to the clusters based on the data located in each of the clusters; and wherein the mapping structure for each cluster is selected from the group consisting of a file system, a block system, and an object store.

2. The method of claim 1, wherein each of the worldwide task trackers is associated with a domain, where the domain associated with each of the worldwide task trackers has one or more network nodes.

3. The method of claim 2, wherein the worldwide job tracker monitors a progress of the worldwide job by communicating with the worldwide task trackers.

4. The method of claim 3, wherein the worldwide job tracker consolidates result of the worldwide job across the worldwide task trackers.

5. The method of claim 4, wherein the worldwide task trackers distribute the worldwide job to the one or more network nodes in the domain associated with the worldwide task trackers.

6. A computer program product for tracking execution commands in a parallel processing network, the parallel processing network having network nodes, the network nodes grouped into clusters, the computer program product comprising:
a non-transitory computer readable medium encoded with computer executable program code, the code configured to enable the execution of:
representing a worldwide job tracker; and
representing worldwide task trackers, the worldwide task trackers communicatively coupled to the worldwide job tracker, wherein the worldwide job tracker is enabled to execute a worldwide job by distributing the worldwide job across the worldwide task trackers to the clusters, wherein each of the clusters is enabled to use the network nodes of each respective cluster to perform parallel processing, wherein each cluster is enabled to contain data; wherein each of the clusters has a mapping structure mapping out the distribution of the data of the cluster; wherein the parallel processing network has a worldwide mapping structure mapping over the mapping structure of each cluster to create a map of the data in each of the other clusters to enable a worldwide view of the data in each of the clusters and enable operations to be performed on each of the clusters; wherein the worldwide mapping structure denotes location of the data in each of the nodes in each of the clusters; wherein each of the worldwide task trackers is enabled to monitor processing of a portion of the worldwide job distributed to each respective cluster, and wherein the worldwide job tracker enables orchestration between the clusters to execute the worldwide job and wherein the worldwide mapping structure enables the worldwide job to be distributed to the clusters based on the data located in each of the clusters; and wherein the mapping structure for each cluster is selected from the group consisting of a file system, a block system, and an object store.

7. The computer program product of claim 6, wherein each of the worldwide task trackers is associated with a domain, where the domain associated with each of the worldwide task trackers has one or more network nodes.

8. The computer program product of claim 7, wherein the code is further configured to enable the execution of:

monitoring, by the worldwide job tracker, a progress of the worldwide job by communicating with the worldwide task trackers.

9. The computer program product of claim 8, wherein the code is further configured to enable the execution of:
consolidating, at the worldwide job tracker, result of the worldwide job across the worldwide task trackers.

10. The computer program product of claim 9, wherein the code is further configured to enable the execution of:
distributing, by the worldwide task trackers, the worldwide job to the one or more network nodes in the domain associates with the worldwide task trackers.

11. A system for tracking execution commands in a parallel processing network, the parallel processing network having network nodes, the network nodes grouped into clusters, the system comprising:
one or more computer having a memory and one or more processor cores;
computer-executable program code operating in the memory, wherein the computer-executable program code, executed by the one or more processor cores, is configured for execution of:
representing a worldwide job tracker, and
representing worldwide task trackers, the worldwide task trackers communicatively coupled to the worldwide job tracker, wherein the worldwide job tracker is enabled to execute a worldwide job by distributing the worldwide job across the worldwide task trackers to the clusters, wherein each of the clusters is enabled to use the network nodes of each respective cluster to perform parallel processing, wherein each cluster is enabled to contain data; wherein each of the clusters has a mapping structure mapping out the distribution of the data of the cluster; wherein the parallel processing network has a worldwide mapping structure mapping over the mapping structure of each cluster to create a map of the data in each of the other clusters to enable a worldwide view of the data in each of the clusters and enable operations to be performed on each of the clusters; wherein the worldwide mapping structure denotes location of the data in each of the nodes in each of the clusters; wherein each of the worldwide task trackers is enabled to monitor processing of a portion of the worldwide job distributed to each respective cluster, and wherein the worldwide job tracker enables orchestration between the clusters to execute the worldwide job and wherein the worldwide mapping structure enables the worldwide job to be distributed to the clusters based on the data located in each of the clusters; and wherein the mapping structure for each cluster is selected from the group consisting of a file system, a block system, and an object store.

12. The system of claim 11, wherein the code is further enabled for each of the worldwide task trackers to be associated with a domain, where the domain associated with each of the worldwide task trackers has one or more network nodes.

13. The system of claim 12, the code further comprising:
monitoring, by the worldwide job tracker, a progress of the worldwide job by communicating with the worldwide task trackers.

14. The system of claim 13, the code further comprising:
consolidating, at the worldwide job tracker, result of the worldwide job across the worldwide task trackers.

15. The system of claim 14, further comprising:
distributing, by the worldwide task trackers, the worldwide job to the one or more network nodes in the domain associated with the worldwide task trackers.

* * * * *